United States Patent
Akanuma

(10) Patent No.: US 11,789,258 B2
(45) Date of Patent: Oct. 17, 2023

(54) LIGHT DEFLECTOR, DEFLECTING DEVICE, OBJECT RECOGNITION DEVICE, IMAGE PROJECTION DEVICE, AND MOBILE OBJECT

(71) Applicant: Ricoh Company, Ltd., Tokyo (JP)

(72) Inventor: Goichi Akanuma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 427 days.

(21) Appl. No.: 16/953,632

(22) Filed: Nov. 20, 2020

(65) Prior Publication Data

US 2021/0157128 A1    May 27, 2021

(30) Foreign Application Priority Data

Nov. 27, 2019    (JP) ................................ 2019-214515
Oct. 1, 2020    (JP) ................................ 2020-167189

(51) Int. Cl.
    *G02B 26/08*        (2006.01)
    *G02B 26/10*        (2006.01)
    *G02B 7/182*         (2021.01)
    *G02B 5/08*          (2006.01)

(52) U.S. Cl.
CPC ............ *G02B 26/105* (2013.01); *G02B 5/08* (2013.01); *G02B 7/182* (2013.01)

(58) Field of Classification Search
CPC ........ G02B 26/105; G02B 5/08; G02B 7/182; G02B 27/01; G02B 5/0808; G02B 26/101; G02B 26/0858
See application file for complete search history.

(56) References Cited

U.S. PATENT DOCUMENTS

| | | | |
|---|---|---|---|
| 6,177,667 B1 | 1/2001 | Fujita et al. | |
| 2010/0033685 A1 | 2/2010 | Seo et al. | |
| 2010/0195180 A1 | 8/2010 | Akanuma et al. | |
| 2010/0309536 A1 | 12/2010 | Akanuma et al. | |
| 2012/0120470 A1 | 5/2012 | Kitazawa et al. | |
| 2014/0327946 A1* | 11/2014 | van Lierop ........ | G02B 26/0841 359/198.1 |
| 2015/0062683 A1 | 3/2015 | Akanuma et al. | |
| 2015/0077823 A1 | 3/2015 | Hashiguchi et al. | |
| 2016/0109697 A1 | 4/2016 | Nakagawa et al. | |
| 2016/0139404 A1 | 5/2016 | Akanuma | |
| 2019/0258049 A1* | 8/2019 | Sakurai .............. | G02B 26/0858 |
| 2019/0391394 A1 | 12/2019 | Shinkawa et al. | |
| 2020/0183151 A1 | 6/2020 | Nanjyo et al. | |

FOREIGN PATENT DOCUMENTS

| | | |
|---|---|---|
| JP | 2011-018026 | 1/2011 |
| JP | 2014-056020 | 3/2014 |
| JP | 2015-129867 | 7/2015 |
| JP | 2017-016018 | 1/2017 |
| JP | 2019-144416 | 8/2019 |

* cited by examiner

*Primary Examiner* — Euncha P Cherry
(74) *Attorney, Agent, or Firm* — XSENSUS LLP

(57) ABSTRACT

A light deflector including a mirror unit configured to reflect light; a pair of supports, one end of each of the pair of supports coupled to the mirror unit to support the mirror unit; a pair of drive beams each coupled to the other end of a corresponding support of the pair of supports, the pair of drive beams being configured to deform the pair of supports to rotate the mirror unit around a first axis; and connecting parts connecting the pair of drive beams to the pair of supports, respectively. Each of the connecting parts having a rib.

20 Claims, 20 Drawing Sheets

LIGHT DEFLECTOR, DEFLECTING DEVICE, OBJECT RECOGNITION DEVICE, IMAGE PROJECTION DEVICE, AND MOBILE OBJECT

CROSS-REFERENCE TO RELATED APPLICATIONS

This patent application is based on and claims priority pursuant to 35 U.S.C. § 119(a) to Japanese Patent Application No. 2019-214515, filed on Nov. 27, 2019 and Japanese Patent Application No. 2020-167189, filed on Oct. 1, 2020 in the Japan Patent Office, the entire disclosures of which are hereby incorporated by reference herein.

BACKGROUND

Technical Field

Embodiments of the present disclosure relate to a light deflector, a deflecting device, an object recognition device, an image projection device, and a mobile object.

Related Art

In recent years, with the development of micromachining technology applying semiconductor manufacturing technology, development of micro electro mechanical systems (MEMS) devices manufactured by micromachining silicon or glass is advancing.

A MEMS device is used as a light deflector that causes a mirror unit to oscillate using a piezoelectric actuator. The piezoelectric actuator has a structure in which the mirror unit having a reflecting surface; a torsion bar, and a beam (e.g., an elastic beam) are formed as a single integrated unit on a wafer, and a thin film of piezoelectric material is formed on the beam.

SUMMARY

In one aspect of this disclosure, there is described light deflector including: a mirror unit configured to reflect light; a pair of supports, one end of each of the pair of supports coupled to the mirror unit to support the mirror unit; a pair of drive beams each coupled to the other end of a corresponding support of the pair of supports, the pair of drive beams being configured to deform the pair of supports to rotate the mirror unit around a first axis; and connecting parts connecting the pair of drive beams to the pair of supports, respectively. Each of the connecting parts having a rib.

In another aspect of this disclosure, there is disclosed a deflecting device including the light deflector and a light source.

In even another aspect of this disclosure, there is disclosed an object recognition device including the light deflector.

In still another aspect of this disclosure, a mobile object includes the object recognition device.

Further described is an image projection device including the light deflector.

Still further described is a mobile object including the image projection device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
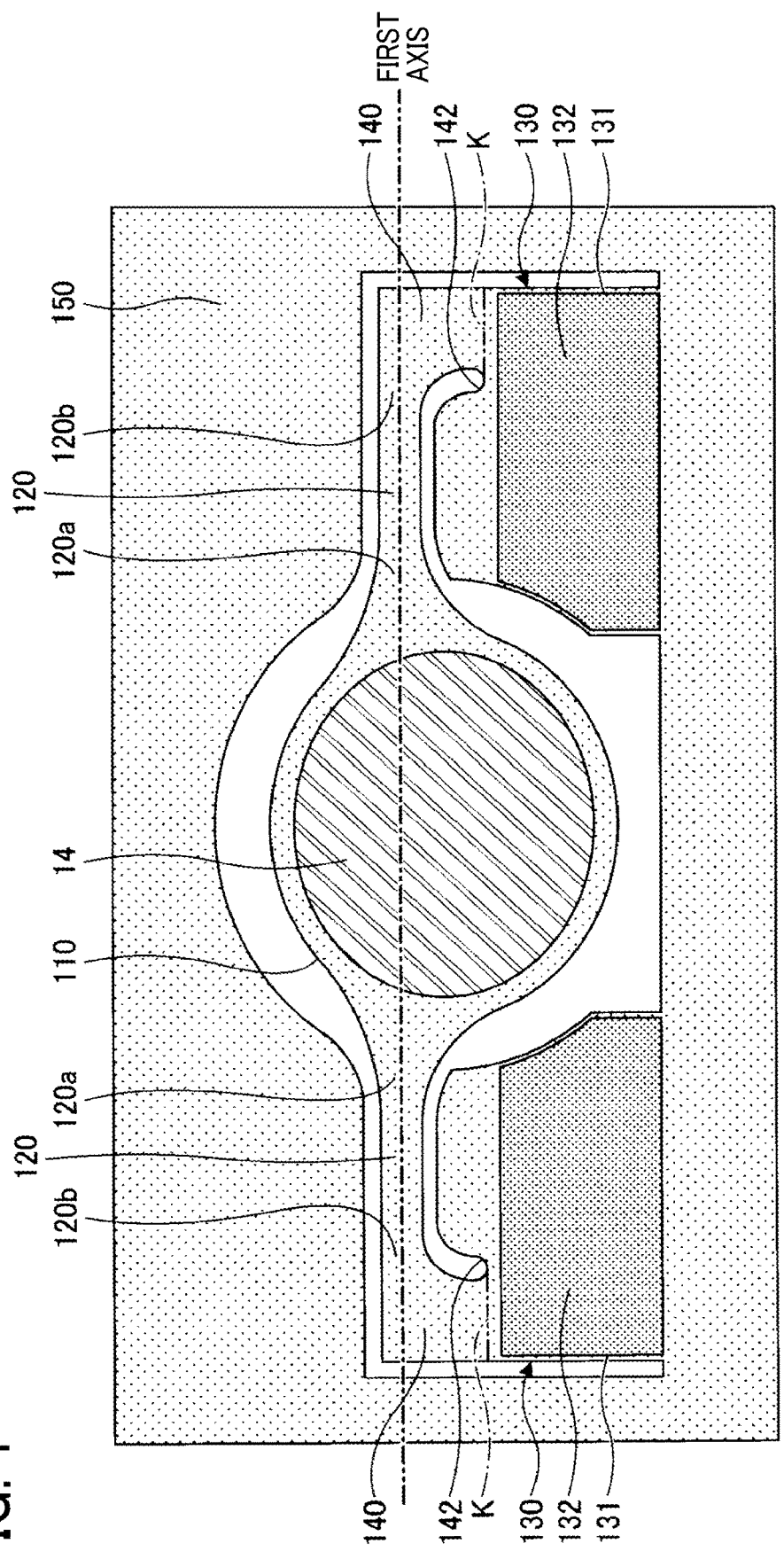
FIG. 1 is a top view of a light deflector according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

The embodiments of the present disclosure achieve an increase in a deflection angle at which a light deflector reaches a breaking point so as to obtain a wider angle of view.

The embodiments of the present invention are described in detail referring to the drawings. Like reference signs are applied to identical or corresponding components throughout the drawings and redundant description thereof may be omitted.

In recent years, there is a demand for a mirror unit of a light deflector for use in an image forming apparatus to have higher resolution and greater amplitude so as to enable the image forming apparatus to obtain higher quality images.

The speed of rotation of the mirror unit increase in proportion to the amplitude of the mirror unit. Further, as the amplitude of the mirror unit increases, the stress applied to a stationary part and a torsion bar supporting a mirror unit increases. In addition to the increase in the stress on the torsion bar and the stationary part, the angle of deflection of the mirror unit reaches a breaking limit to cause damage to the torsion bar and the stationary parts, thus resulting in the breakdown of the light deflector.

More scanning lines are needed to obtain a higher resolution of the mirror unit, and the drive frequency (i.e., the resonance frequency) is to be increased to obtain more scanning lines. As the resonance frequency of the mirror unit increases, the rotational acceleration of the mirror unit increases in proportion to the square of the resonance frequency. With an increase in the frequency of the mirror unit, the load on the stationary part and torsion bar supporting the mirror unit increases abruptly even when the amplitude of the mirror unit remains unchanged. When the road on the stationary part and the torsion bar exceeds the breaking strength of the torsion bar and the stationary part, the light deflector might be damaged.

In the typical light deflectors with a cantilever structure, one edge of a connecting part between a torsion bar and a drive beam (i.e., a beam) supporting the torsion bar in a cantilevered state is open, which might cause the connecting part to be deformed more significantly with an increasing frequency of the mirror unit. With such a deformation of the connecting part, the twist of the torsion bar is more likely to cause an overload on the connecting part between the torsion bar and the drive beam, resulting in a failure of the light deflector.

In the light deflector according to the present embodiment, the connecting part connecting the torsion bar and the drive beam has a rib structure. The rib structure prevents the connecting part from being deformed due to an increase in the load on the connecting part with increasing amplitude and frequency of the mirror unit, and thus reduces the stress on the connecting parts. This advantageously increases the deflection angle at which the light deflector reaches a breaking point.

Figure 2:
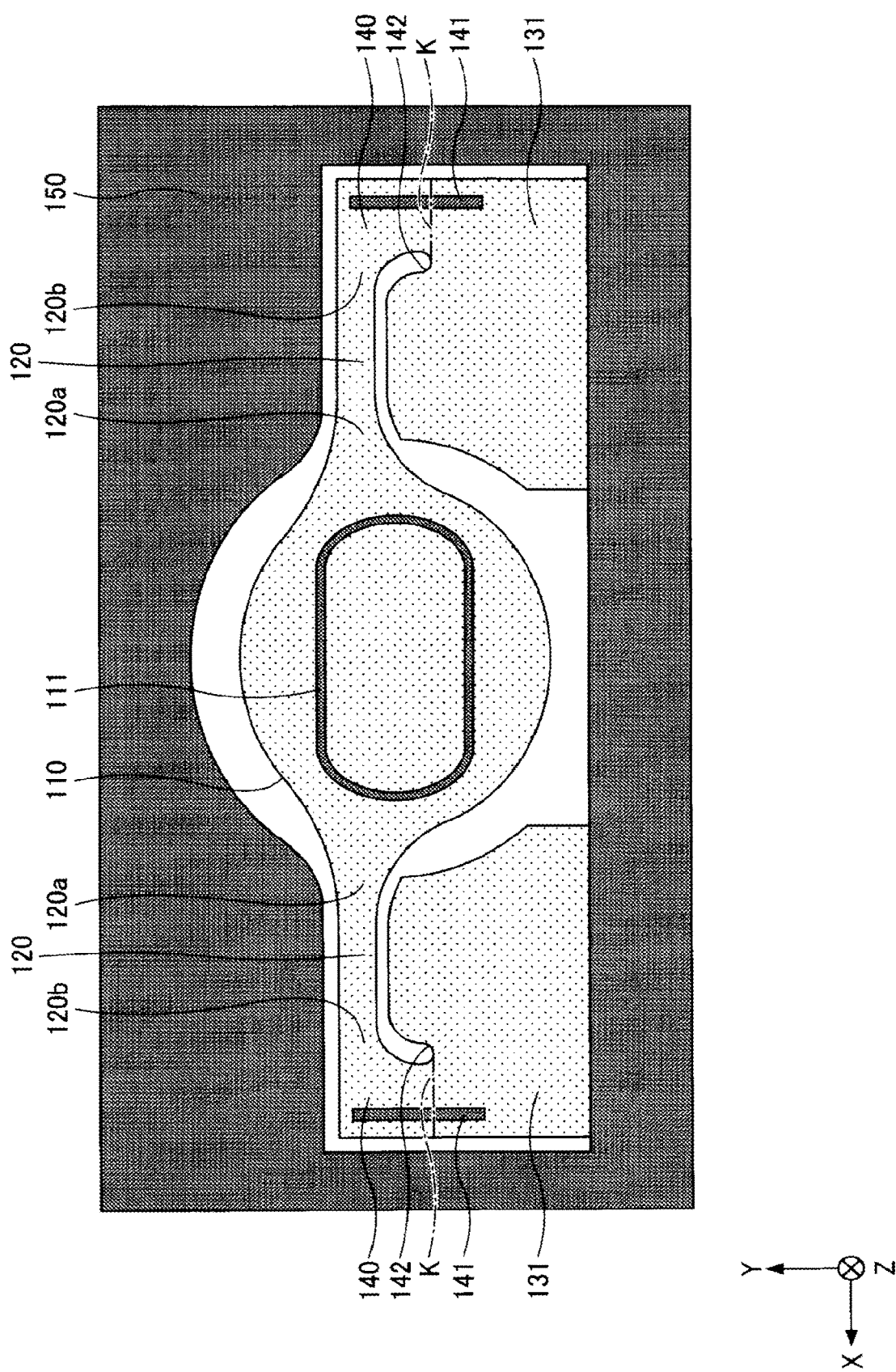
FIG. 2 is a rear view of the light deflector in FIG. 1.

A light deflector according to a first embodiment of the present disclosure is described with reference to FIGS. 1 and 2. FIG. 1 is a top view of the light deflector according to the present embodiment, and FIG. 2 is a rear view of the light deflector in FIG. 1.

The light deflector according to the present embodiment includes a mirror unit 110 and torsion bars 120 at both sides of the mirror unit 110, respectively. The mirror unit 110 has a reflecting surface 14. The torsion bars 120 are typically referred to as a torsion bar spring. In the present disclosure, it is referred to as a torsion bar 120.

One end 120a of each torsion bar 120 is coupled to the mirror unit 110, and the other end 120b of each torsion bar 120 is coupled to a corresponding drive beam 130 through a connecting part 140. The drive beam 130 is provided at each end of the axis (i.e., the X-axis) of the torsion bars 120.

The drive beam 130 includes a bar 131 and a piezoelectric material 132 stacked on the bar 131, and is a rectangular flat plate of a unimorph structure, for example. The bar 131 is a base, such as a silicon substrate. One end of the drive beam 130 is coupled to a stationary frame 150, and the other end of the drive beam 130 is coupled to the other end 120b of each torsion bar 120 through a corresponding connecting part 140. In the present disclosure, the stationary frame 150 is sometimes referred to simply as a frame.

In such a configuration of the light deflector, the mirror unit 110 and the pair of torsion bars 120 are supported by the drive beams 130 at one side (e.g., −Y side) of the light deflector of the first axis serving as the rotation axis of the mirror unit 110 (i.e., the central axis of the pair of torsion bars 120). In other words, in the light deflector according to the first embodiment, the drive beams 130 are supported by the stationary frame 150 in a cantilevered state.

In the present embodiment, an X-axis direction refers to a direction along the central axis of the twist of the torsion bars 120, that is, the first axis of the mirror unit 110. A Z-axis direction refers to a normal to the reflecting surface 14 of the mirror unit 110, and a Y-axis direction refers to a direction orthogonal to the X-axis direction and the Z-axis direction. Further, a connecting part 140 is a portion connecting the torsion bar 120 and the drive beam 130 on the base of a silicon substrate.

The light deflector according to the present embodiment includes a mirror-unit rib 111 at the back side of the mirror unit 110, and a connecting-part rib 141 at the back side of the connecting part 140. The connecting-part rib 141 is formed to extend in a direction (i.e., the Y-axis direction) intersecting with the first axis that is a rotation axis. The connecting-part rib 141 on back side of the connecting part 140 prevents or reduce the deformation that might occur at the connecting part 140. This reduces the stress on the connecting part 140 during the rotation of the mirror unit 110 and thus advantageously increases a deflection angle at which the light deflector reaches a breaking point. As a result, the mirror unit 110 rotates at a higher amplitude.

A boundary (i.e., a connecting line) between the drive beam 130 and the connecting part 140 is indicated by a hypothetical line K that extends, along the first axis, from the edge of the fixed-end fillet 142 of a fillet shape, the edge being proximate to the drive beam 130. In the present embodiment, the connecting-part rib 141 extending across the hypothetical line K increases the strength of the connecting part 140, and thus prevent the failure of the light deflector. The connecting-part rib 141 straddles the hypothetical line K extending from the edge of the fixed-end fillet 142 along the first axis (i.e., the X-axis direction), the edge being proximate to the drive beam 130. In other words, the connecting-part rib 141 lies across the hypothetical line K.

The connecting-part rib 141, which extends along the Y-axis direction orthogonal to the first axis, on the connecting part 140 and the drive beam 130 prevents or reduce the deformation of the connecting part 140 due to an increase in the load caused by an increase in the amplitude and the frequency of the mirror unit 110 and further reduces the stress on the connecting part 140. As a result, a deflection angle at which the light deflector reaches a breaking point is increased.

In the light deflector according to the present embodiment, a silicon on insulator (SOI) substrate is processed to form the mirror unit 110, the torsion bars 120, and the drive beams 130 as a single integrated unit. The reflecting surface 14 of the mirror unit 110 is a thin film of metal, such as aluminum or silver, formed on the surface of the silicon substrate.

The drive beam 130 supports the torsion bars 120 and the mirror unit 110 in a cantilevered state. The +Y end of each drive beam 130 is a free end. This enables the mirror unit 110 to rotate at a significant deflection angle without undesired constraints during the rotation. With this configuration, a rotational power generated by the bending of the drive beam 130 is effectively transmitted to cause the torsion bars 120 to be deformed in a twisting direction.

The light deflector with a cantilever structure as illustrated in FIGS. 1 and 2 is designed to have a bending resonance induced by the drive beam 130 and a twist resonance induced by the torsion bars 120, which are appropriately designed to increase the operation sensitivity, that is, a deflection angle with respect to a voltage applied to the light deflector. In the light deflector with a cantilever structure, a deflection angle of the light deflector is subject to constraints of the deflection angle at which the light deflector reaches the breaking point. Such a deflection angle of the light deflector to reach the breaking point is determined by the strength of a silicon layer constituting the mirror unit 110, the torsion bars 120, and the bar 131 of the drive beam 130.

As the strength limit or the fracture stress of the light deflector is determined by the material (i.e., silicon), the light deflector is to be designed to have a lower stress generated by the rotation of the mirror unit 110 than the fracture stress. In the light deflector according to the present embodiment, the connecting part 140 includes the connecting-part rib 141 on the back side. This configuration reduces or eliminates the stress applied to the connecting part 140 during the rotation of the mirror unit 110 and advantageously increases a deflection angle at which the light deflector reaches a breaking point.

Without such a connecting-part rib 141 on the back side of the connecting part 140 in a light deflector according to a comparative example, the stress would be concentrated on a prescribed position on the hypothetical line K and the fixed-end fillet at a portion proximate to the drive beam. In the light deflector according to the present embodiment, however, the connecting-part rib 141 is provided on the back side of the connecting part 140. This configuration reduces the stress generated on a prescribed position on the hypothetical line K and the fixed-end fillet 142 of the connecting part 140 at a portion proximate to the drive beam 130.

Figure 3:
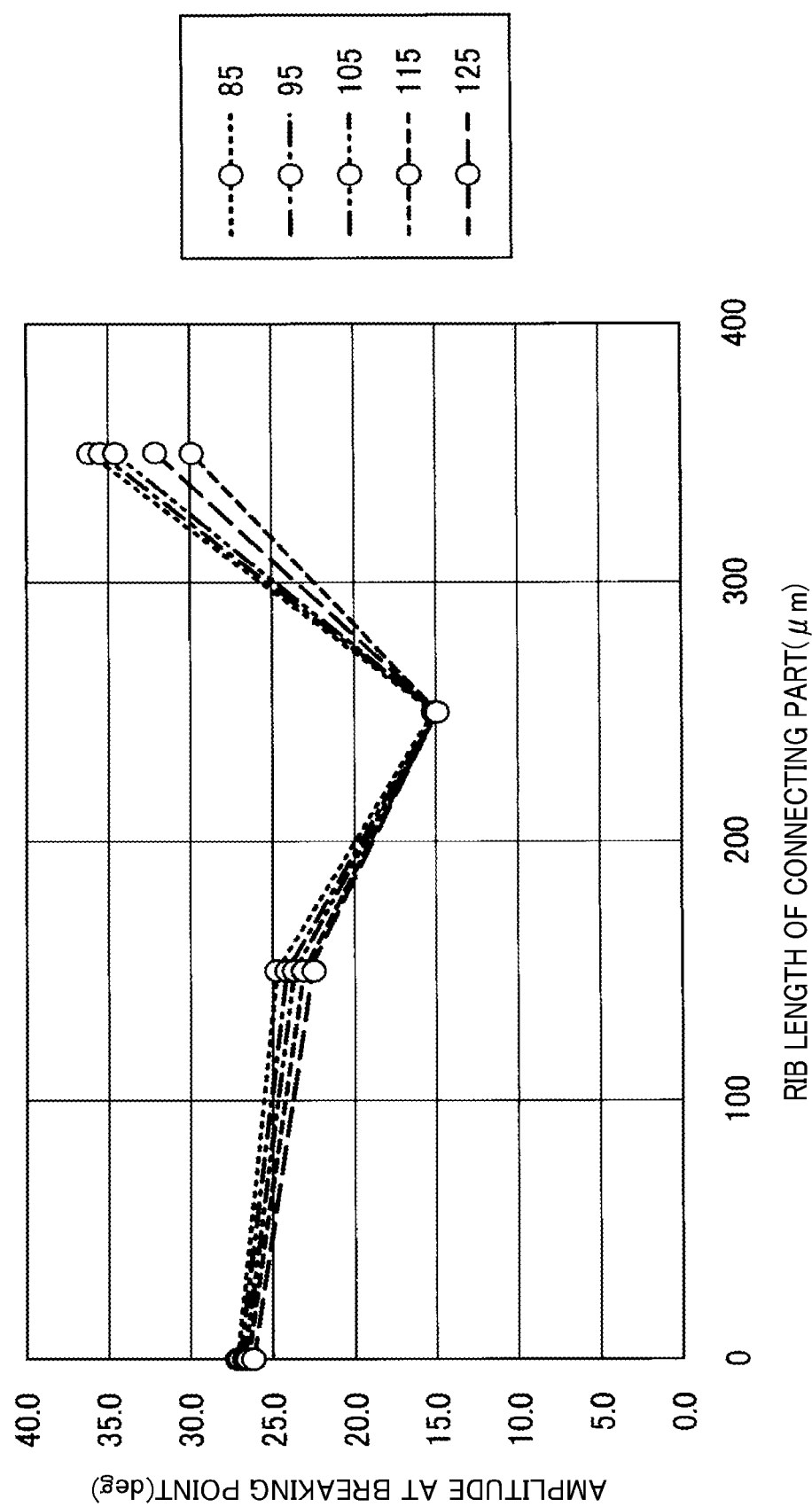
FIG. 3 is a scatter diagram of the length of a connecting-part rib of a connecting part and the amplitude at a breaking point.
Figure 4:
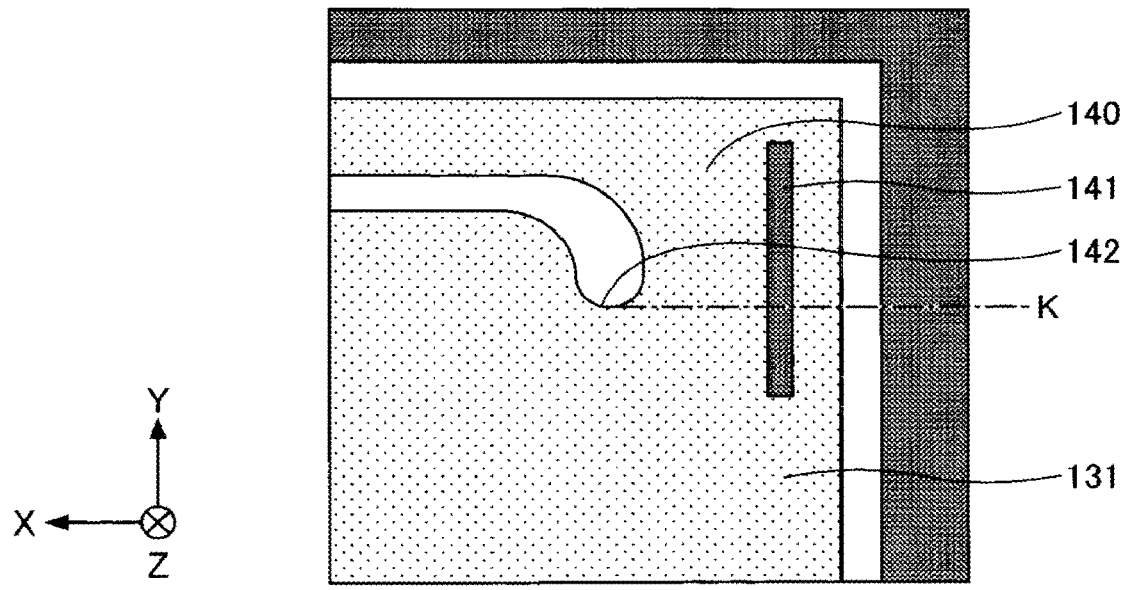
FIG. 4 is an illustration of a connecting-part rib of the light deflector in FIG. 1.

FIG. 3 is a scatter diagram of the amplitude at a breaking point and the length of the connecting-part rib 141 of the connecting part 140, which are estimated from the stress on the connecting part 140 obtained from a finite-element simulation. The amplitude at a breaking point is obtained by obtaining a fracture stress by experiment and converting the obtained fracture stress based on the stress obtained from the finite-element simulation. In FIG. 3, 0 micrometer (μm) of the length of the connecting-part rib indicates the case where the connecting-part rib 141 is not provided on the light deflector. As illustrated in FIG. 3, the connecting-part rib 141 with a length of 350 μm achieves an increase in the fracture strength to obtain a breaking-point amplitude (i.e., an amplitude at a breaking point) of approximately 30 degrees or more. In this case, as illustrated in FIG. 4, the connecting-part rib 141 extends beyond the −Y edge of the fixed-end fillet 142 in a direction toward the drive beam 130. In other words, the connecting-part rib 141 extends beyond the fixed-end fillet 142 at which the width of the connecting part 140 in the X-axis direction is smallest, in the direction toward the drive beam 130. This arrangement successfully increases the amplitude at a breaking point. It is to be noted that five-level parameters 85, 95, 105, 115, and 125 in FIG. 3 are design parameters related to the offset amount relative to the center of the mirror unit 110 of the torsion bar 120, and these parameters are used to optimize the balance of the cantilever structure. The same tendency is observed for each of the five-level parameters.

Figure 5:
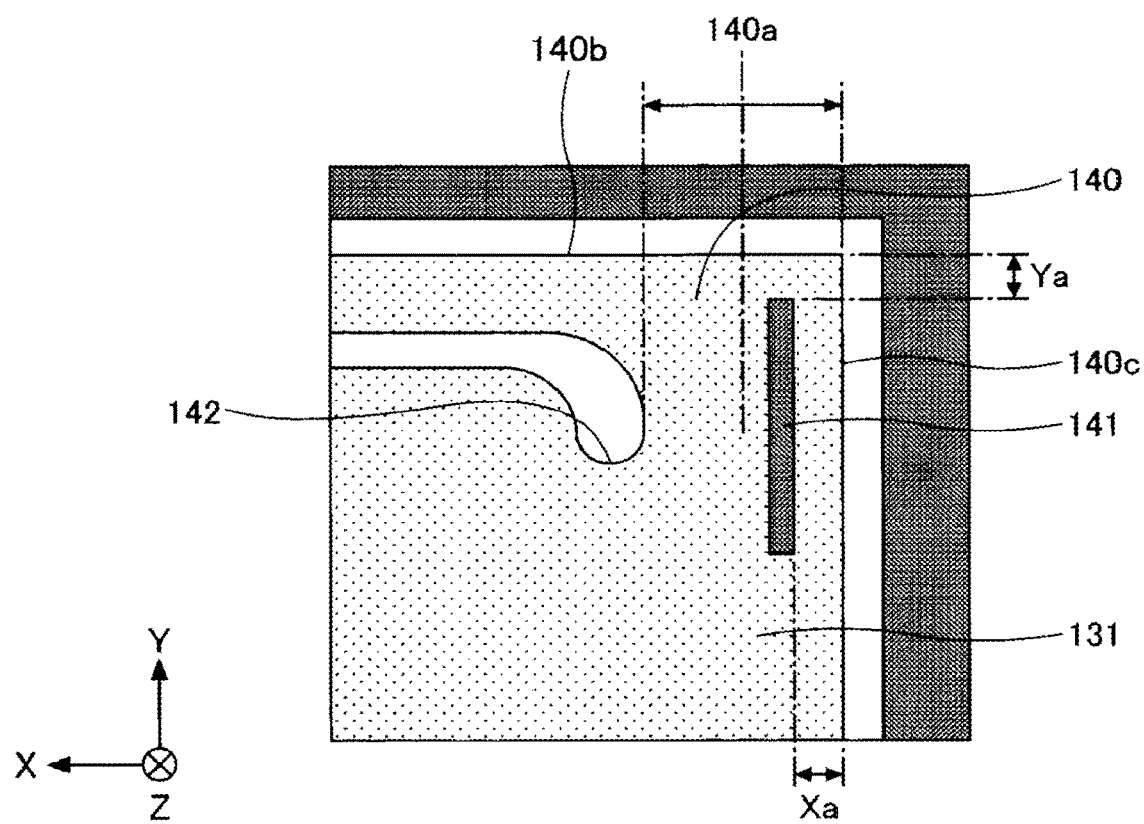
FIG. 5 is another illustration of the connecting-part rib of the light deflector in FIG. 1.

The following describes a position of the connecting-part rib 141 with reference to FIG. 5. When the connecting part 140 is divided by a hypothetical center line 140a along the Y-axis direction into two areas in the X-axis direction, the connecting-part rib 141 is disposed in one area farther from the torsion bar 120 than the other area (i.e., the other area at the opposite side of the one area is closer to the torsion bar 120). In this arrangement, the connecting-part rib 141 is apart from the torsion bar 120. This prevents the twisting deformation of the torsion bar 120 from being abruptly restrained by the connecting-part rib 141 so as to avoid the stress concentration, which would otherwise occur. As a result, the deflection angle at which the light deflector reaches a breaking point is increased.

Further, the connecting-part rib 141 is at an inner side relative to the +Y edge 140b and the −Y edge 140c of the connecting part 140 by certain length. Specifically, the connecting-part rib 141 is apart from the +Y edge 140b of the connecting part 140 by Ya in the −Y direction, and also apart from the −X edge 140c of the connecting part 140 by Xa in the +X direction. If a connecting-part rib is at the edge of the connecting part, the stress concentration might occur. However, the connecting-part rib 141 at the inner side relative to the edges of the connecting part 140 prevents the occurrence of the stress concentration.

Figure 6:
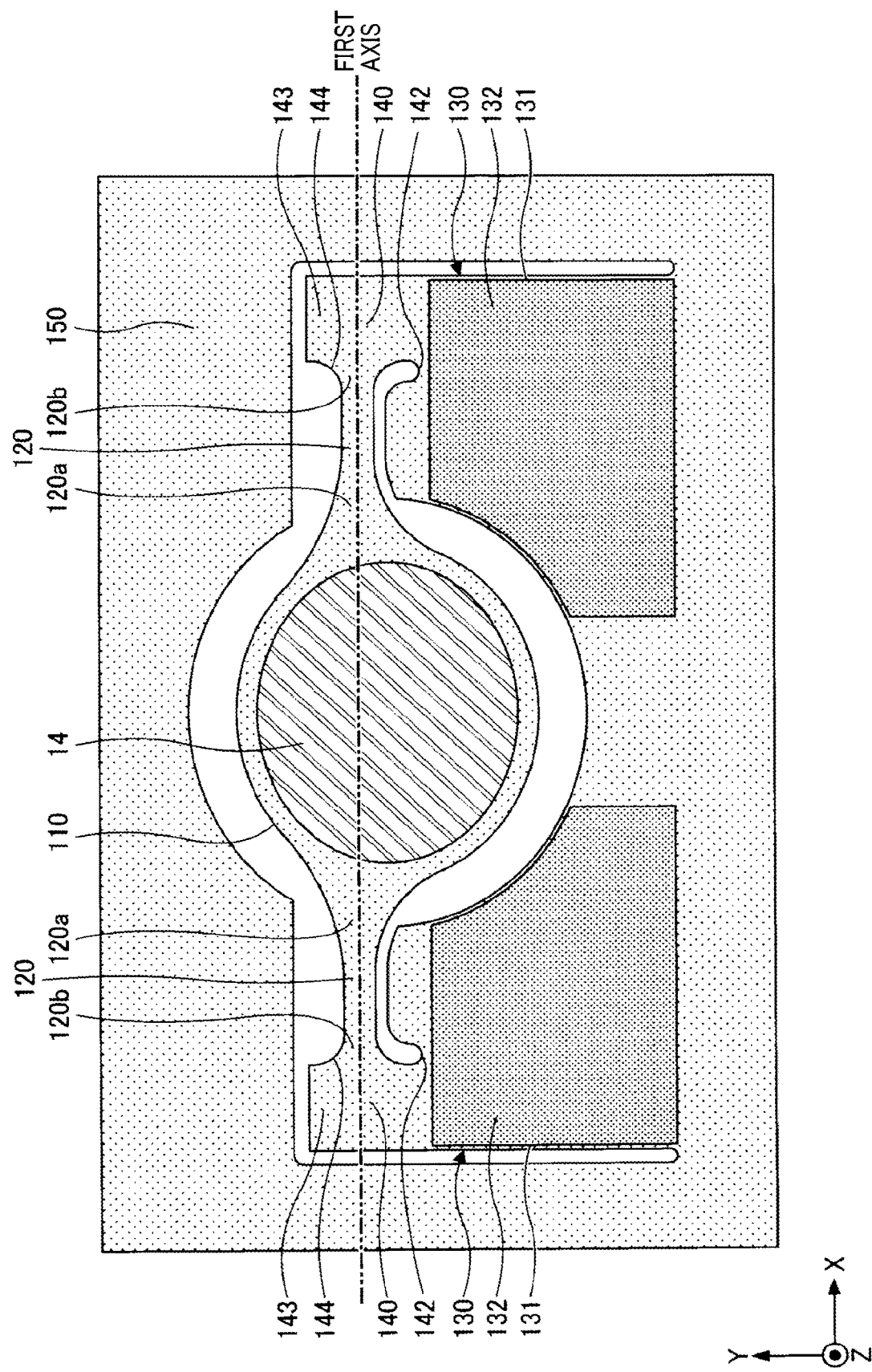
FIG. 6 is a top view of a light deflector according to second first embodiment of the present disclosure.
Figure 7:
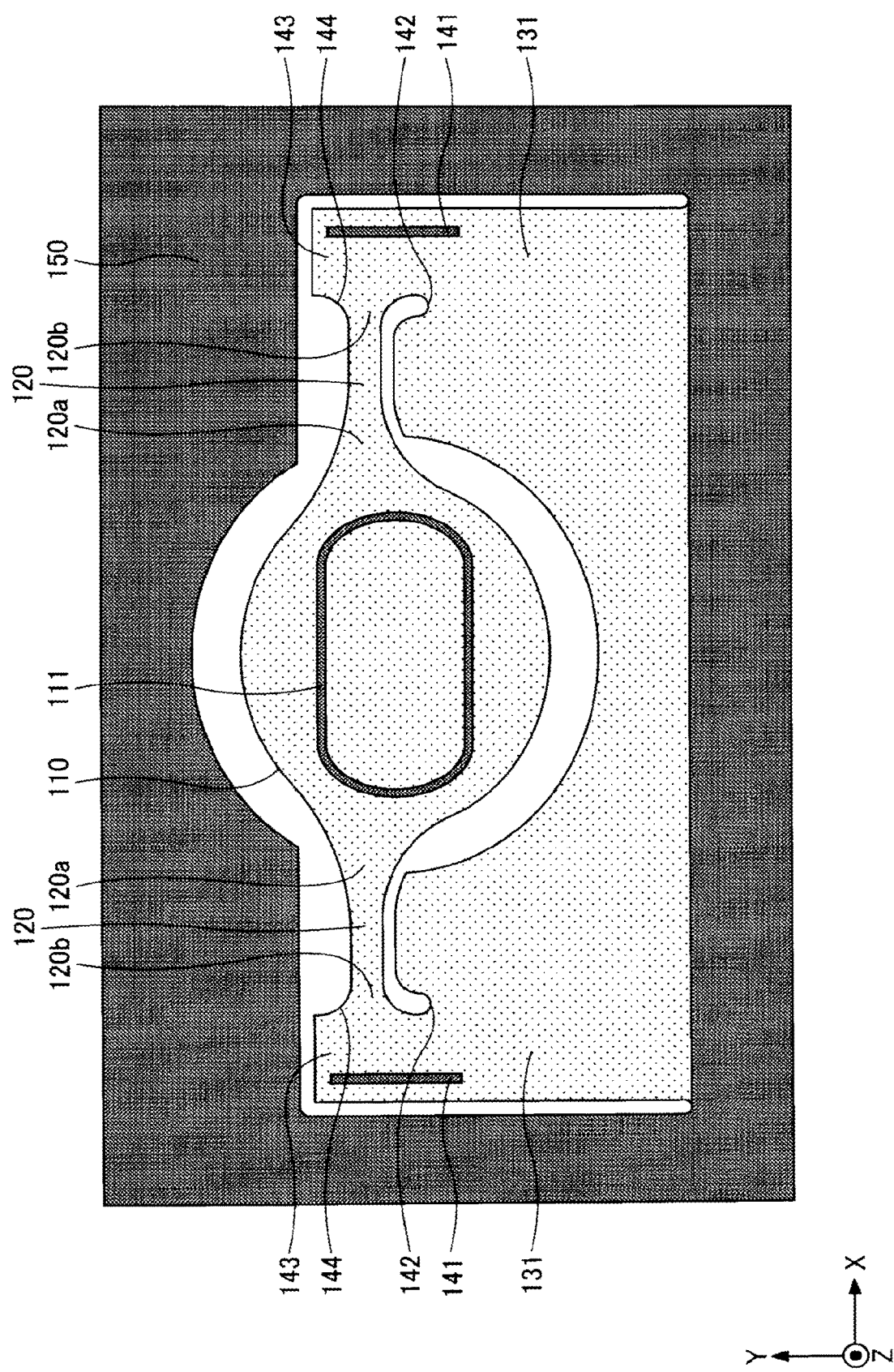
FIG. 7 is a rear view of the light deflector in FIG. 2.

A light deflector according to a second embodiment of the present disclosure is described with reference to FIGS. 6 and 7. FIG. 6 is a top view of the light deflector according to the present embodiment, and FIG. 7 is a rear view of the light deflector in FIG. 6.

The light deflector according to the present embodiment is provided with a projection 143 at the +Y end of the connecting part 140 (i.e., at the opposite side of the drive-beam-130 side of the connecting part 140), and a free-end fillet 144 at a portion proximate to the torsion bar 120 in the projection 143. Further, a fixed-end fillet 142 is provided at the −Y end of the connecting part 140 (i.e., at the drive-beam-130 side of the connecting part 140). In the light deflector according to the present embodiment, the free-end fillet 144 is at one side of the torsion bar 120, and the fixed-end fillet 142 is at the other side of the torsion bar 120. The free-end fillet 144 is provided to prevent the stress from being generated by the twist of the torsion bar 120. Further, the free-end fillet 144 is referred to as a first fillet, and the fixed-end fillet 142 is referred to as a second fillet.

In the light deflector according to the present embodiment, the connecting-part rib 141 is also provided at the projection 143. In other words, in the present embodiment, the connecting-part rib 141 extends beyond the +Y edge of the torsion bar 120 in the +Y direction. The connecting-part rib 141 is formed to extend in a direction intersecting with the first axis, about which the mirror unit 110 rotates, that is, the central axis of the torsion bar 120. In some examples, the connecting-part rib 141 extends in the Y-axis direction orthogonal to the first axis. This configuration prevents or reduces the deformation of the connecting part 140, and reduces the stress on the connecting part 140 during the rotation of the mirror unit 110. This advantageously increases the deflection angle at which the light deflector reaches a breaking point, and thus enables the mirror unit 110 to rotate at higher amplitude.

In the light deflector according to the present embodiment, the free-end fillet 144 may have an arc shape. The fixed-end fillet 142 and the free-end fillet 144 have different curvatures. Specifically, the free-end fillet 144 has a smaller curvature than the fixed-end fillet 142.

If the fixed-end fillet 142 and the free-end fillet 144 have an arc shape with the same curvature, the stress applied to a portion proximate to the fixed-end fillet 142 would be increased. To deal with such an issue, the light deflector according to the present embodiment is designed such that the free-end fillet 144 has a smaller curvature than the fixed-end fillet 142. This equalizes the stress applied to the portion proximate to the fixed-end fillet 142 and the stress applied to the portion proximate to the free-end fillet 144.

In some examples, the free-end fillet 144 has an elliptic shape. In this case, the major axis of the ellipse is parallel to the X-axis direction, that is, the longitudinal direction of the torsion bar 120.

In some other examples, a free-end fillet 144 has an arc shape with a radius of curvature, and a central angle θ of the fillet shape of the free-end fillet 144 is 90 degrees or less.

Such a shape reduces the length of the projection 143 in the +Y direction, which further reduces the weight of the drive beam 130 and thus increases the resonance frequency while preventing a failure of the light deflector due to the bending of the drive beam 130.

Figure 8:
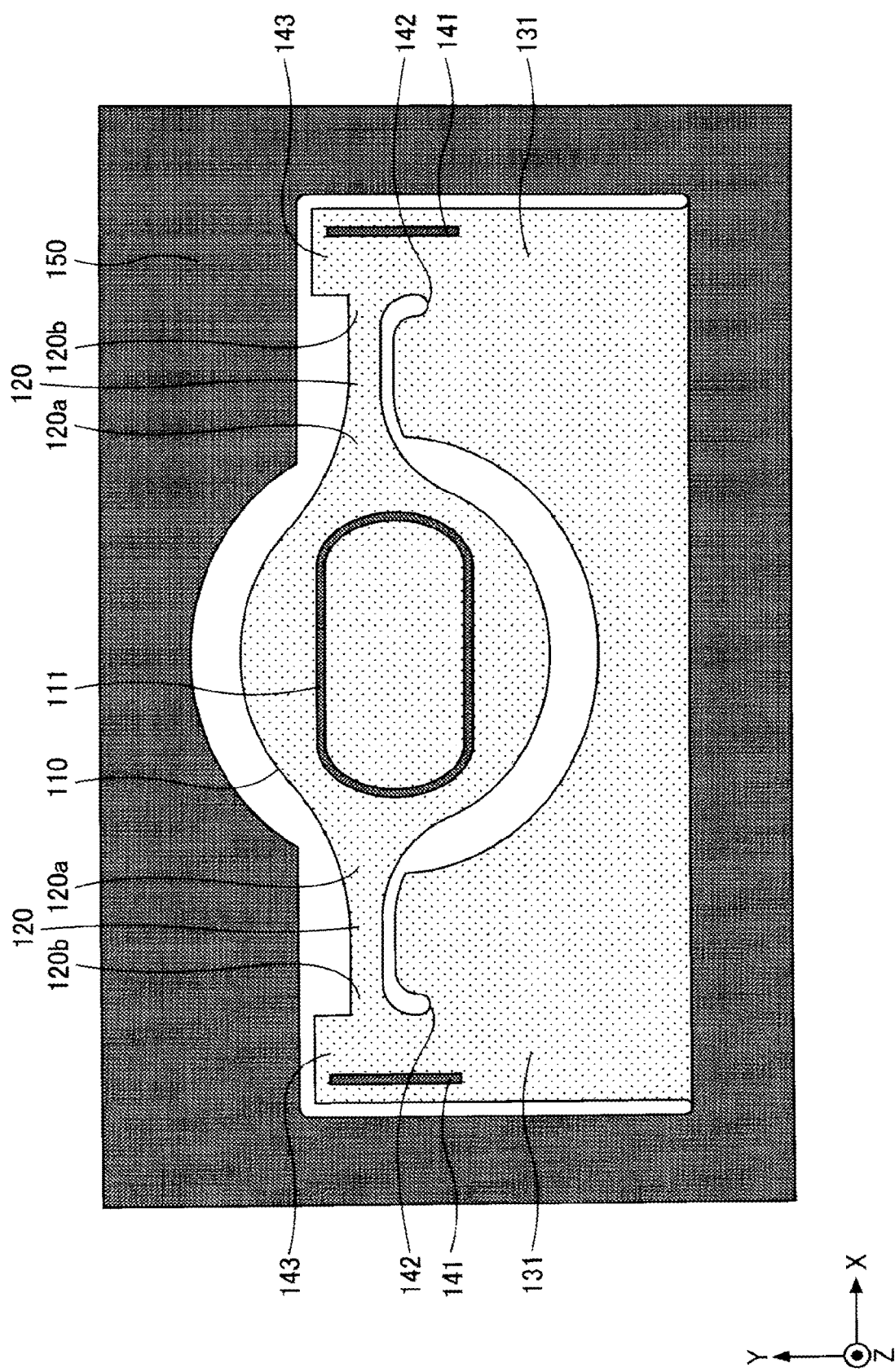
FIG. 8 is a rear view of a light deflector according to a modification of the second embodiment.

The light deflector as illustrated in FIGS. 6 and 7 is provided with the free-end fillets 144. As illustrated in FIG. 8, however, the light deflector according to the present embodiment may not be provided with the free-end fillets 144. The light deflector of the configuration as illustrated in FIG. 8 also exhibits the advantageous effects of the connecting-part rib 141 extending to the projection 143.

The characteristic features other than those described above are the same as those in the first embodiment.

Figure 9:
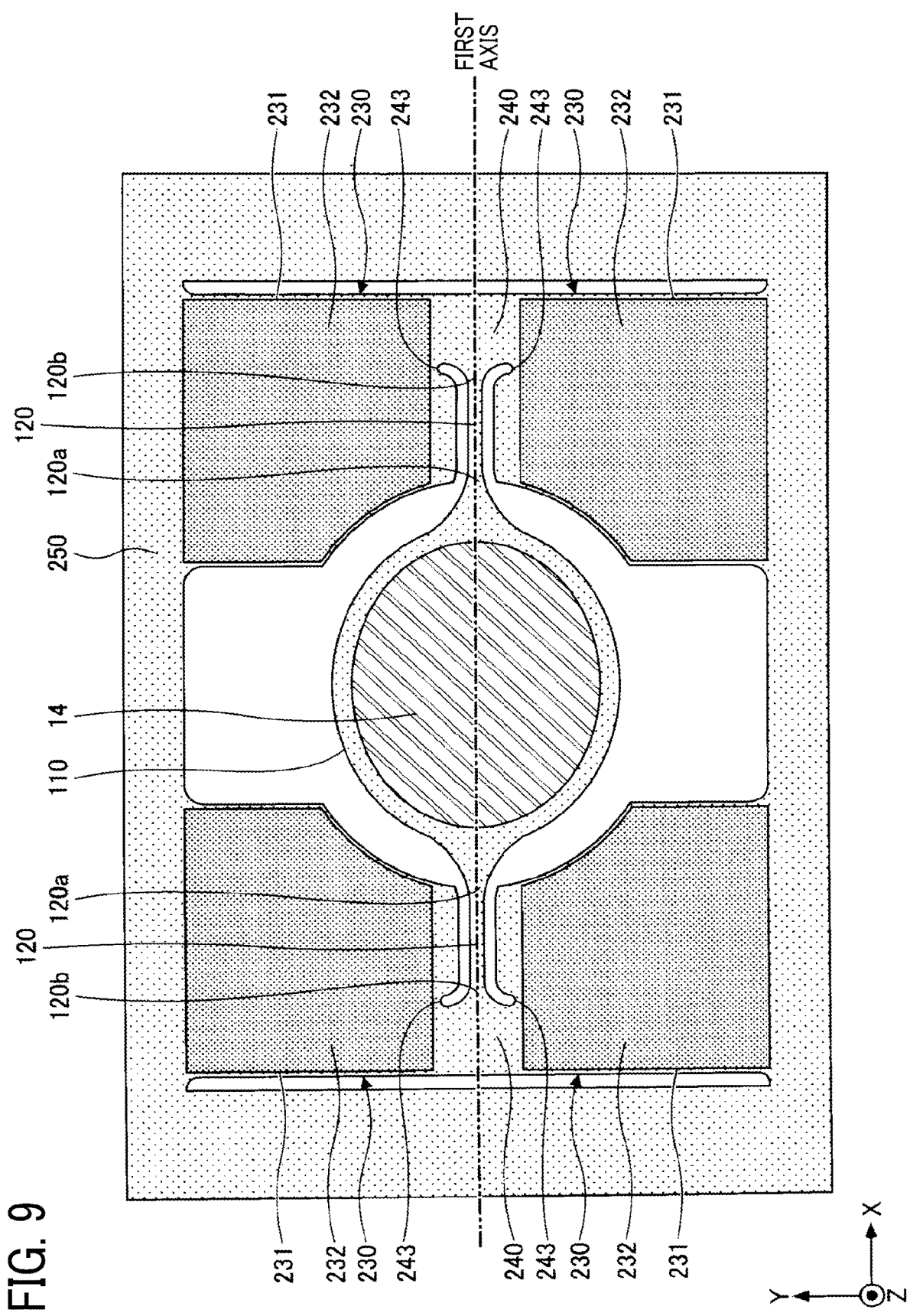
FIG. 9 is a top view of a light deflector according to a third embodiment of the present disclosure.
Figure 10:
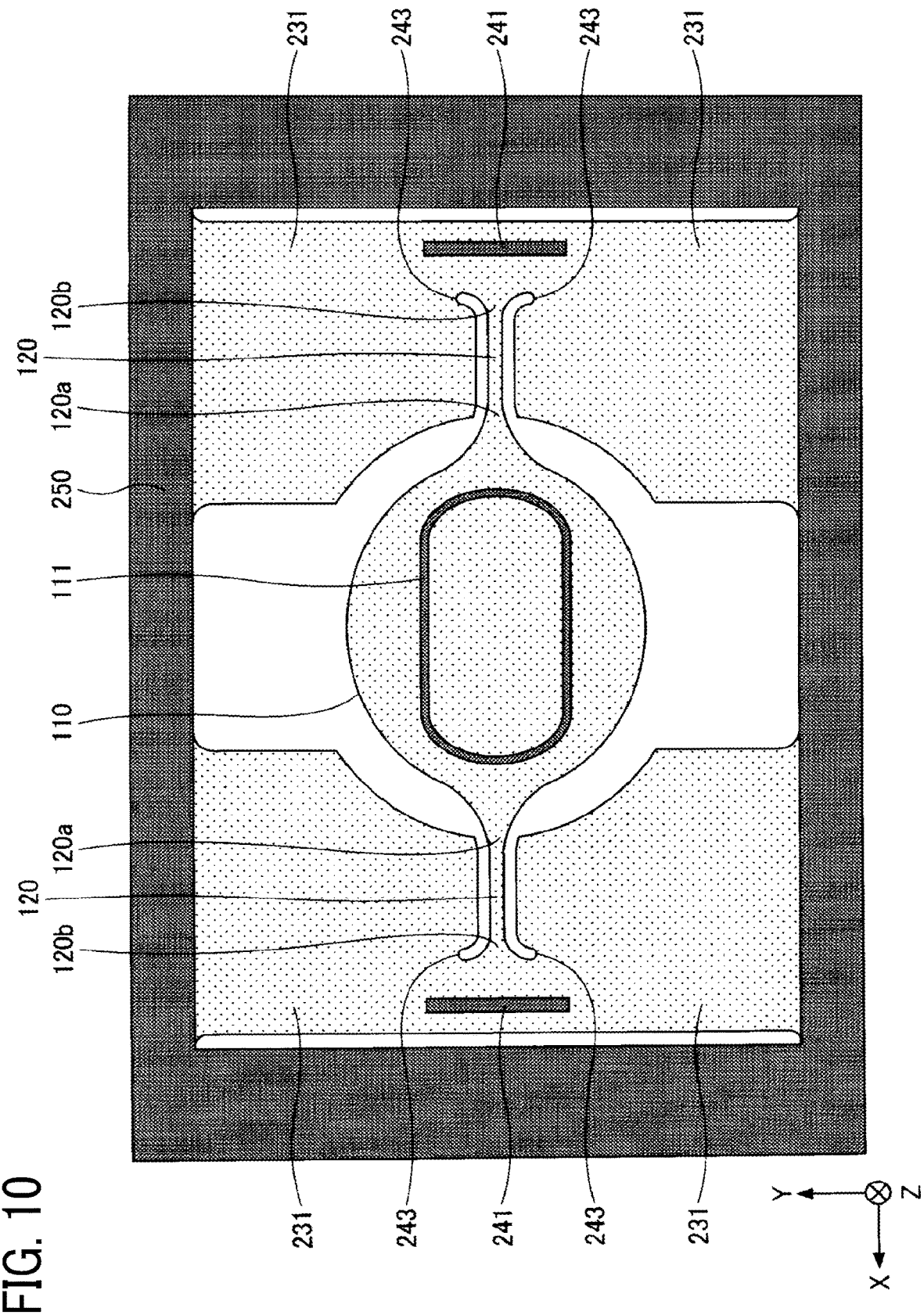
FIG. 10 is a rear view of the light deflector in FIG. 9.

A light deflector according to a third embodiment of the present disclosure is described with reference to FIGS. 9 and 10. FIG. 9 is a top view of the light deflector according to the present embodiment, and FIG. 10 is a rear view of the light deflector in FIG. 9.

The light deflector according to the present embodiment includes a mirror unit 110 and torsion bars 120 at both sides of the mirror unit 110, respectively. The mirror unit 110 has a reflecting surface 14.

One end 120a of each torsion bar 120 is coupled to the mirror unit 110, and the other end 120b of each torsion bar 120 is coupled to a corresponding drive beam 230 through a connecting part 240. The drive beam 230 is disposed at each side of the torsion bar 120 that extends along the axial direction (i.e., in the X-axis direction).

In the light deflector according to the present embodiment, the pair of torsion bars 120 is supported by the drive beams 230 on both sides of the pair of torsion bars 120 whose central axis is along the first axis. In other words, as illustrated in FIG. 10, two drive beams 230 support each of the pair of torsion bars 120, and four drive beams 230 in total are provided at the light deflector according to the present embodiment.

The drive beam 230 includes a beam 231 and a piezoelectric material 232 stacked on the bar 131, and is a rectangular flat plate of a unimorph structure. The bar 131 is a base, such as a silicon substrate. One end of the drive beam 230 is coupled to a stationary frame 250, and the other end of the drive beam 130 is coupled to the other end 120b of each torsion bar 120 through a corresponding connecting part 240. In the present disclosure, the stationary frame 250 is sometimes referred to also as a frame.

The drive beam 230 is disposed at each side of the central axis of the torsion bar 120 at the other end 120b of the torsion bar 120. In this configuration, the mirror unit 110 and the torsion bars 120 are supported by the stationary frame 250 through bar-shaped members at both sides of the first axis. In other words, the mirror unit 110 and the torsion bars 120 are supported by the drive beams 230 at the +Y side and the drive beams 230 at the −Y side of the first axis.

As illustrated in FIGS. 9 and 10, the connecting-part rib 241 extending in the Y-axis direction orthogonal to the first axis (i.e., the rotation axis of the mirror unit 110) is disposed at the back side of the connecting part 240 connecting the torsion bar 120 and the drive beam 230. This configuration prevents or reduces the deformation of the connecting part 240, and reduces the stress on the connecting part 240 during the rotation of the mirror unit 110. This advantageously increases the deflection angle at which the light deflector reaches a breaking point, and thus enables the mirror unit 110 to rotate at higher amplitude.

Figure 11:
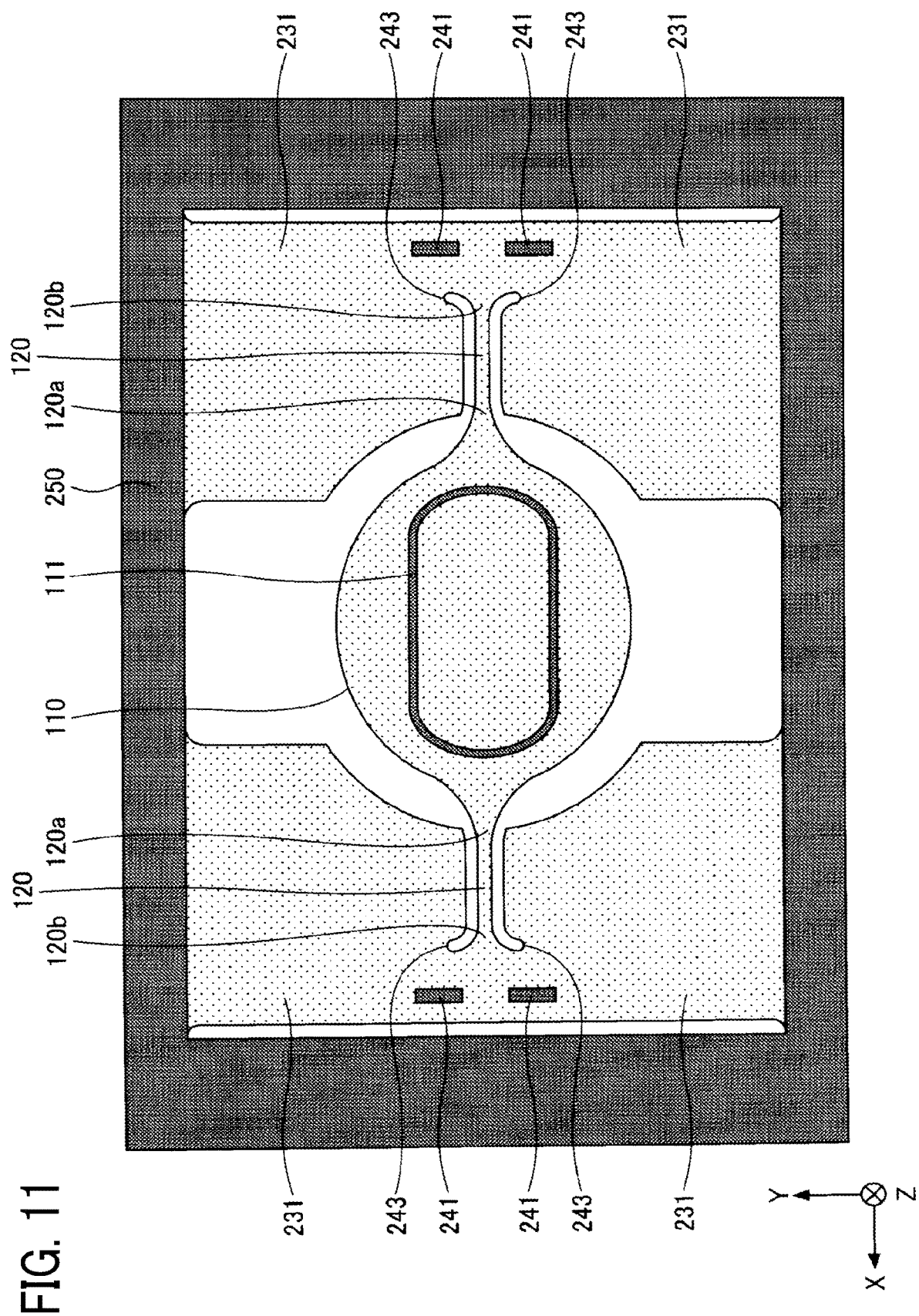
FIG. 11 is a rear view of a light deflector according to a modification of the third embodiment.

The connecting-part rib 241 may be a single continuous rib. Alternatively, the connecting-part rib 241 may be divided into two parts with the central axis of the torsion bar 120 therebetween as illustrated in FIG. 11. Such a configuration in which the connecting-part rib 241 is divided into two parts as illustrated in FIG. 11 slightly reduces the rigidity of the connecting part 240, and causes the connecting part 240 to be less impervious to breaking down. However, in such a configuration, the deformation caused by the force of the drive beams 230 is more likely to be transmitted to the torsion bars 120, thus enabling the mirror unit 110 to rotate at a higher amplitude.

The characteristic features other than those described above are the same as those in the first embodiment.

Figure 12:
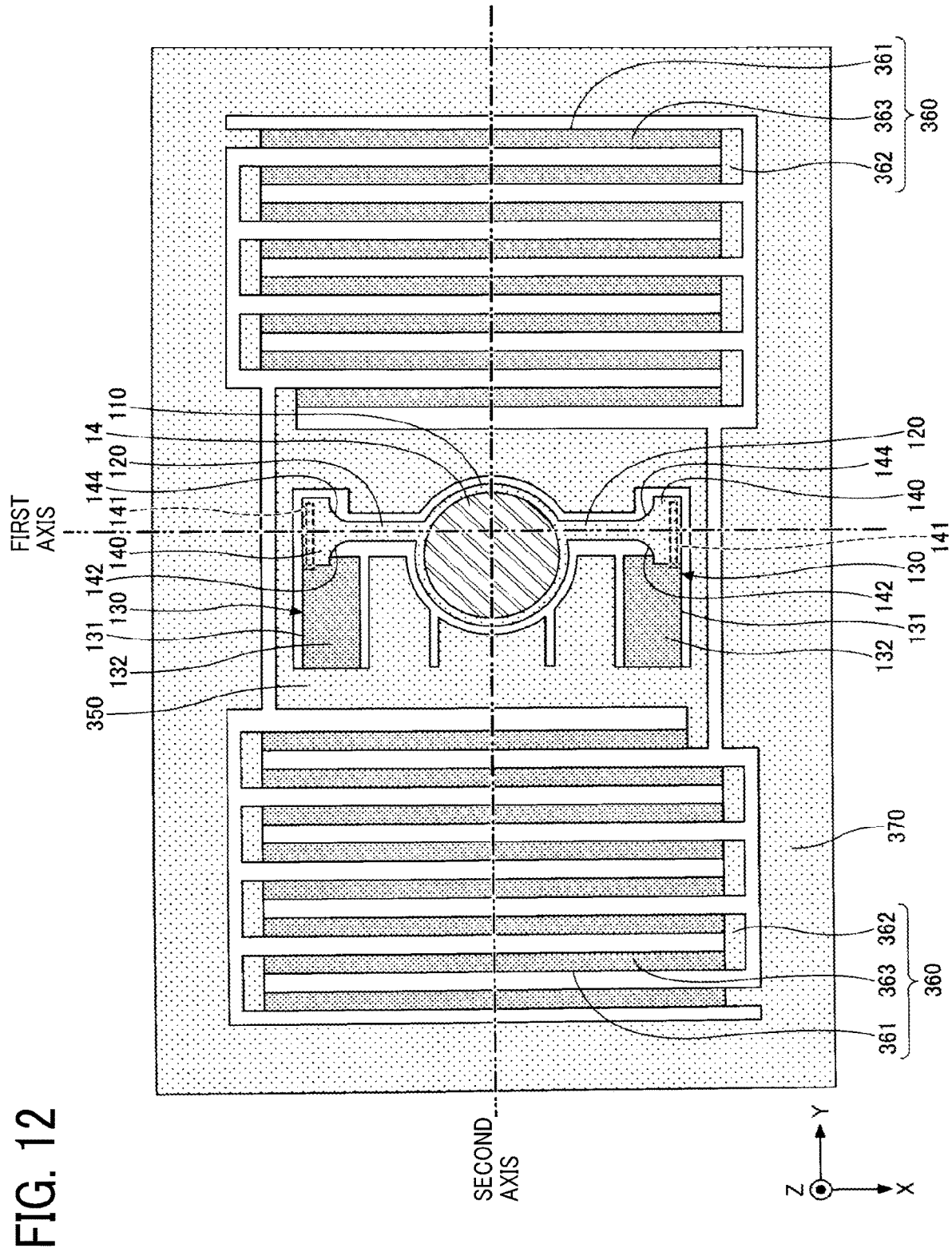
FIG. 12 is a top view of a light deflector according to a fourth embodiment of the present disclosure.

Next, a light deflector according to a fourth embodiment is described. The light deflector according to the fourth embodiment is rotatable around the first axis and a second axis orthogonal to the first axis. Specifically, the light deflector in FIG. 12 is provided with the mirror unit 110, the torsion bars 120, the drive beams 130, the fixed-end fillet 142, and the free-end fillet 144, which are configured according to the second embodiment, within a sub-scanning movable frame 350. The drive beam 130 is supported by the movable frame 350, and the mirror unit 110 is rotatable about the first axis. In the light deflector according to the present embodiment, the drive beam 130 is a main-scanning drive beam.

The movable frame 350 is provided with a movable-frame support 360 at each side thereof, and each movable-frame support 360 has a meandering structure. The movable-frame support 360 includes a plurality of beams 361 whose longitudinal direction is the X-axis direction, beam connecting parts 362 each connecting adjacent beams 361, and piezoelectric member 363 on the respective beams 361. One end of each of the movable-frame supports 360 is coupled to the movable frame 350, and the other end of each of the movable-frame supports 360 is coupled to the stationary frame 370.

In the light deflector according to the present embodiment, the movable frame 350 as a whole including the mirror unit 110 is rotatable about the second axis in response to a voltage applied to the piezoelectric members 363 on the respective beams 361.

In the above description, the case in which the light deflector according to the second embodiment is disposed inside the movable frame 350 is described. In some embodiments, a light deflector according to the first embodiments or the third embodiment is disposed inside the movable frame 350.

The light deflector according to the first embodiment to the fourth embodiment described above is applicable in an optical scanning system, an image projection device, an optical writing device, and an object recognition device.

With reference to FIGS. 13 to 16, an optical scanning system 10 to which a light deflector according to any of the first embodiment to the fourth embodiment is applied is described below in detail.

Figure 13:
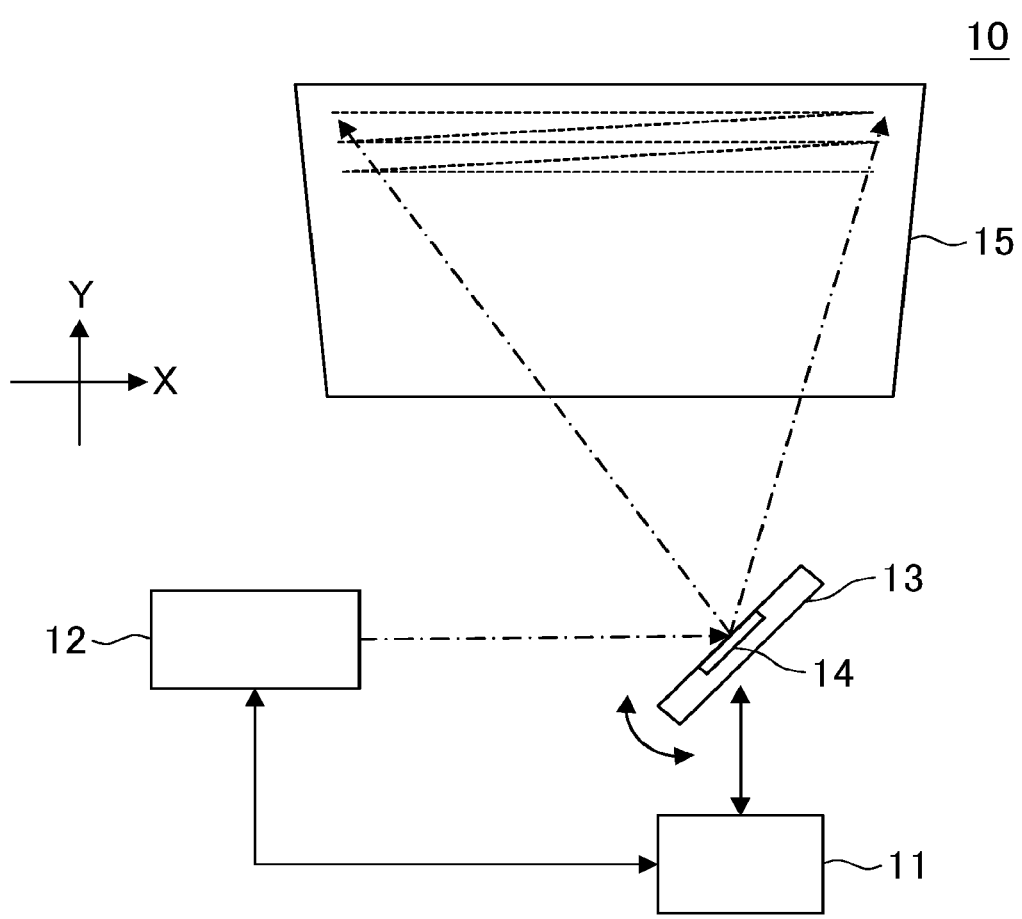
FIG. 13 is a schematic view of an example of an optical scanning system.

FIG. 13 is an illustration of an optical scanning system according to an embodiment of the present disclosure.

As illustrated in FIG. 13, the optical scanning system 10 deflects light emitted from a light-source device 12 in accordance with the control of the driver 11, using a reflecting surface 14 included in a light deflector 13, so as to optically scan a surface 15 to be scanned (target surface). The light deflector 13 is a light deflector according to any one of the first embodiment to the fourth embodiment.

The optical scanning system 10 includes the driver 11, the light-source device 12, and the light deflector 13 including the reflecting surface 14. The optical scanning system 10 is a deflecting device according to an embodiment of the present disclosure.

For example, the driver 11 is an electronic circuit unit provided with a central processing unit (CPU) and a field-programmable gate array (FPGA). The light deflector 13 is, for example, a micro electro mechanical systems (MEMS) device that includes a reflecting surface 14 and that can move the reflecting surface 14. The light-source device 12 is, for example, a laser device that emits a laser beam. The target surface 15 is, for example, a screen.

The driver 11 generates a control instruction of the light-source device 12 and the light deflector 13 based on optical scanning information obtained from an external device, and outputs a drive signal to the light-source device 12 and the light deflector 13 in accordance with the control instruction.

The light-source device 12 emits light based on the received drive signal. The light deflector 13 moves the reflecting surface 14 in at least one of a uniaxial direction and a biaxial direction, based on the received drive signal.

With this configuration, for example, the reflecting surface 14 of the light deflector 13 is biaxially moved in a reciprocating manner within a predetermined range, and the light emitted from the light-source device 12 to be incident on the reflecting surface 14 is deflected to perform optical scanning, under the control of the driver 11, which is based on image data that is an example of the optical-scanning information. Thus, the driver 11 enables projection of an image onto the target surface 15 as desired.

The details of the control of the driver 11 are described later.

Figure 14:
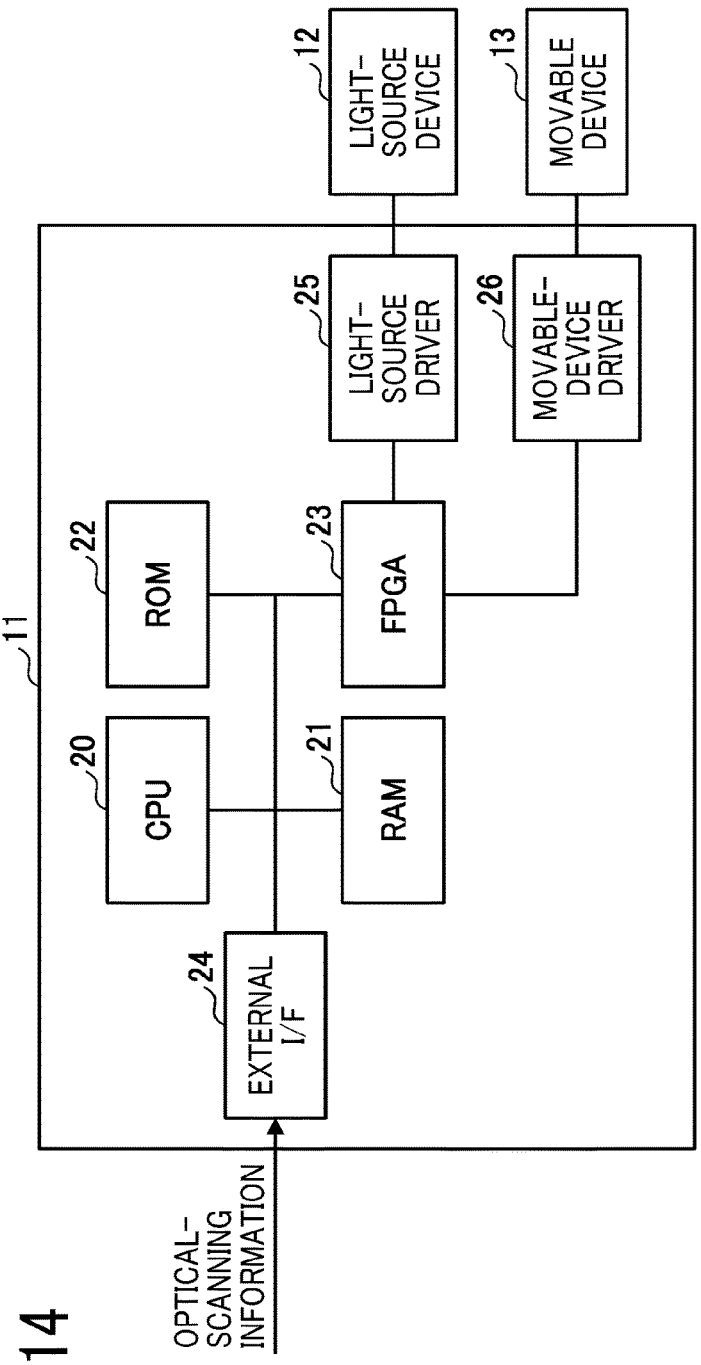
FIG. 14 is a hardware block diagram of the optical scanning system according to an embodiment of the present disclosure.

Referring now to FIG. 14, a hardware configuration of the optical scanning system 10 is described below.

FIG. 14 is a hardware block diagram of an example of the optical scanning system.

As illustrated in FIG. 14, the optical scanning system 10 includes the driver 11, the light-source device 12, and the light deflector 13, which are electrically connected to each other.

Among those elements, the driver 11 is provided with a central processing unit (CPU) 20, a random access memory (RANI) 21, a read only memory (ROM) 22, a field-programmable gate array (FPGA) 23, an external interface (I/F) 24, a light-source device driver 25, and a light-deflector driver 26.

The CPU 20 is an arithmetic device that loads into the RAM 21 a program or data from a storage device such as the ROM 22 and executes processing to provide the controls or functions of the entirety of the driver 11. The RANI 21 is a volatile storage device that temporarily holds a program and data.

The ROM 22 is a non-volatile storage device that stores a program or data even after the power is turned off, and stores a program or data for processing that is executed by the CPU 20 to control each function of the optical scanning system 10.

The FPGA 23 is a circuit that outputs control signals to the light-source driver 25 and the light-deflector driver 26, respectively, according to a process performed by the CPU 20.

For example, the external I/F 24 is an interface with an external device or a network. For example, the external device may be a host device such as a personal computer (PC) and a storage device such as a universal serial bus (USB) memory, a secure digital (SD) card, a compact disc (CD), a digital versatile disc (DVD), a hard disk drive (HDD), or a solid state drive (SSD). For example, the network may be a controller area network (CAN) of a vehicle, a local area network (LAN), or the Internet. The external IN 24 can have any configuration that can achieve connection to an external device or communication with an external device. The external I/F 24 may be provided for each external device.

The light-source driver 25 is an electric circuit that outputs a drive signal such as a drive voltage to the light-source device 12 in accordance with the received control signal.

The light-deflector driver 26 is an electric circuit that outputs a driving signal such as a driving voltage to the light deflector 13 in accordance with the control signal input from the FPGA 23.

The CPU 20 of the driver 11 acquires optical-scanning information from an external device or a network through the external I/F 24. Note that any configuration may be used as long as the CPU 20 can acquire the optical-scanning information, and the optical-scanning information may be stored in the ROM 22 or in the FPGA 23 in the driver 11. Alternatively, a storage device such as an SSD may be additionally provided in the driver 11 and the optical-scanning information may be stored in the storage device.

In this case, the optical-scanning information is information indicating the way of optical scanning to be performed on the target surface 15. For example, the optical-scanning information is image data when an image is displayed by optical scanning. For another example, the optical-scanning information is writing data indicating the order or portion of writing when optical writing is performed by optical scanning. Furthermore, for example, the optical scanning information is irradiation data indicating the timing and range of irradiation of light for object recognition in a case where an object is to be recognized by optical scanning.

The driver 11 can provide the functional configuration described below by using instructions from the CPU 20 and the hardware configuration illustrated in FIG. 14.

Figure 15:
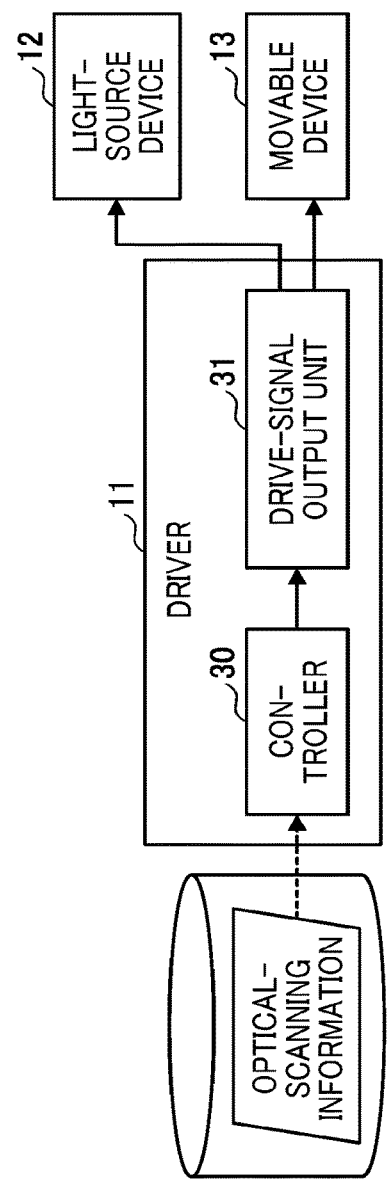
FIG. 15 is a functional block diagram of a driver according to an embodiment of the present disclosure.

The following describes a functional configuration of the driver 11 of the optical scanning system 10, with reference to FIG. 15. FIG. 15 is a functional block diagram of a driver 11 of the optical scanning system 10, according to an embodiment of the present disclosure.

As illustrated in FIG. 15, the driver 11 has the functions of a controller 30 and a driving-signal output unit 31.

The controller 30 is implemented by, for example, the CPU 20, the FPGA 23, and the like. The controller 30 acquires optical-scanning information from an external device, converts the optical-scanning information into a control signal, and outputs the control signal to the drive-signal output unit 31. The controller 30, for example, acquires image data as the optical-scanning information from, for example, an external device, generates a control signal based on the image data through predetermined processing, and outputs the control signal to the drive-signal output unit 31.

The drive-signal output unit 31 is implemented by, for example, the light-source driver 25 or the light-deflector driver 26. The drive-signal output unit 31 outputs a drive signal to the light-source device 12 or the light deflector 13 in accordance with the received control signal. The drive-signal output unit 31 may be provided for each destination to which a driving signal is output.

The drive signal is a signal for controlling the drive of the light-source device 12 or the light deflector 13. For example, the drive signal of the light-source device 12 is a drive voltage used to control the irradiation timing and irradiation intensity of the light source. Further, the drive signal to be output to the light deflector 13 is, for example, a drive voltage used to control the timing and range of motion where the reflecting surface 14 of the light deflector 13 is moved. Alternatively, the driver 11 may obtain, from an external device such as the light-source device 12 or a light receiver, the timing of light emission or timing of light reception of the light emitted from the light source, and may synchronize the obtained timing of light emission or timing of light reception with the operation of the light deflector 13.

Figure 16:
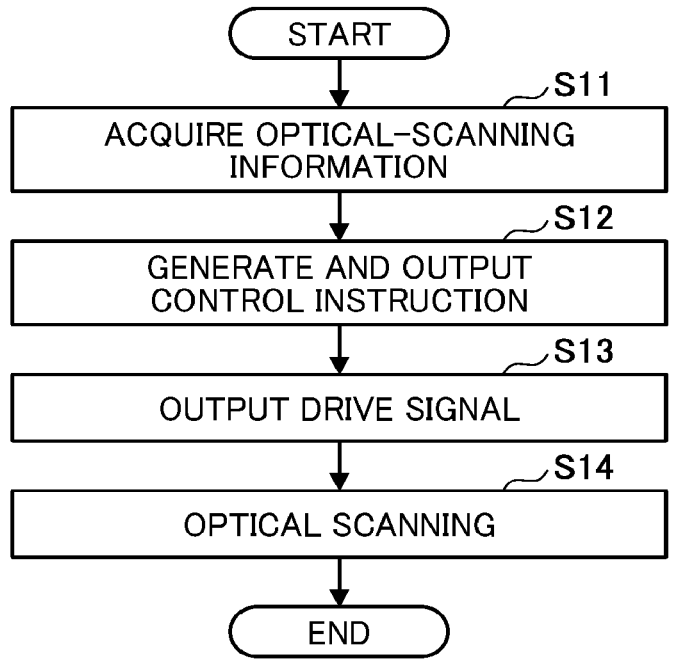
FIG. 16 is a flow chart of the processing involving the optical scanning system, according to an embodiment of the present disclosure.

Next, the process of optically scanning the target surface 15 performed by the optical scanning system 10 is described referring to FIG. 16. FIG. 16 is a flowchart of an example of processing performed by the optical scanning system 10.

In step S11, the controller 30 acquires optical-scanning information from, for example, an external device.

In step S12, the controller 30 generates control signals from the acquired optical-scanning information, and outputs the control signals to the drive-signal output unit 31.

In step S13, the drive-signal output unit 31 outputs drive signals to the light-source device 12 and the light deflector 13, respectively, in accordance with the received control signals.

In step S14, the light-source device 12 emits light based on the received drive signal. In addition, the light deflector 13 moves the reflecting surface 14 based on the received drive signal. Driving the light-source device 12 and the light deflector 13 causes light incident on the reflecting surface 14 to be deflected in any direction, and optical scanning is performed.

In the above-described optical scanning system 10, a single driver 11 controls the light-source device 12 and the light deflector 13. However, a driver for controlling the light-source device and a driver for controlling the movable device may be separate elements.

In the light deflector 10 as described above, a single driver 11 includes functions of the control unit 30, and functions of the driving-signal output unit 31. However, these functions may separately be provided, and for example, a separate drive-signal output device with the drive-signal output unit 31 may be provided in addition to the driver 11 including the control unit 30. In the above-described optical scanning system 10, the light deflector 13 having the reflecting surface 14 and the driver 11 may constitute a light deflection system for performing optical deflection.

Incorporating the light deflector according to the first embodiment to the fourth embodiment into an optical scanning system enables the movable part to scan with light at a higher angle of view and a higher resolution.

Next, an image projection device to which the light deflector 13 according to an embodiment of the present disclosure is applied is described in detail with reference to FIGS. 17 and 18.

Figure 17:
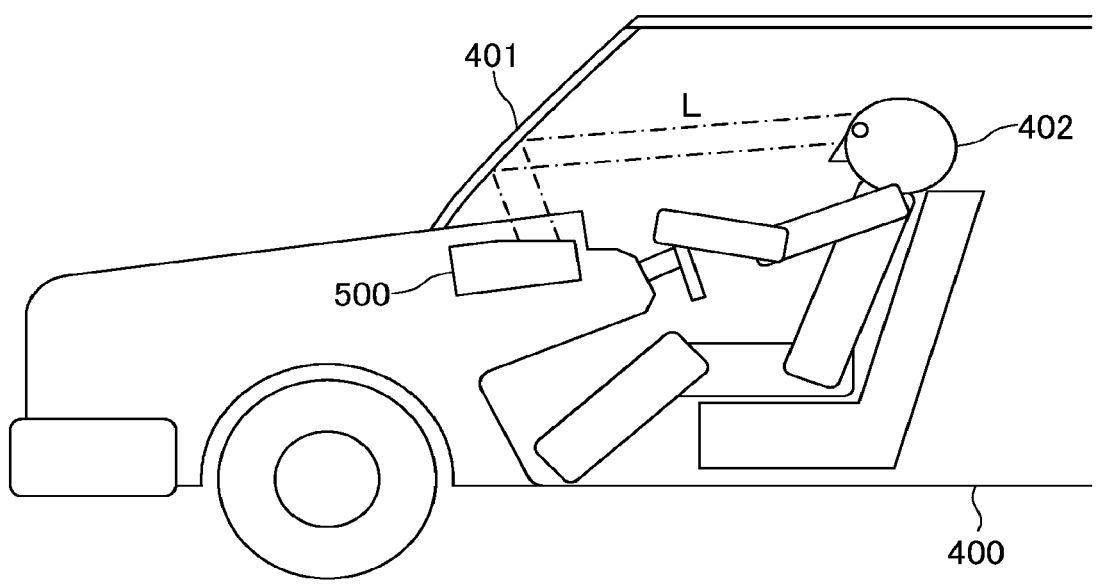
FIG. 17 is a schematic view of an example of a vehicle equipped with a head-up display device (HUD)

FIG. 17 is a schematic view of a vehicle 400 equipped with a HUD 500 as an example of an image projection apparatus according to an embodiment. FIG. 18 is a schematic view of the HUD 500 according to an embodiment of the present disclosure.

The image projection apparatus projects an image by optical scanning, and is, for example, a HUD.

As illustrated in FIG. 17, for example, the HUD 500 is disposed, for example, near a windshield 401 of the vehicle 400. Projection light L that is emitted from the HUD 500 is reflected by the windshield 401 and directed to a viewer (a driver 402) as a user.

Accordingly, the driver 402 can visually recognize an image or the like projected by the HUD 500, as a virtual image. Alternatively, a combiner may be disposed on the inner wall surface of the windshield 401 so that the user can visually recognize a virtual image formed by the projection light that is reflected by the combiner.

Figure 18:
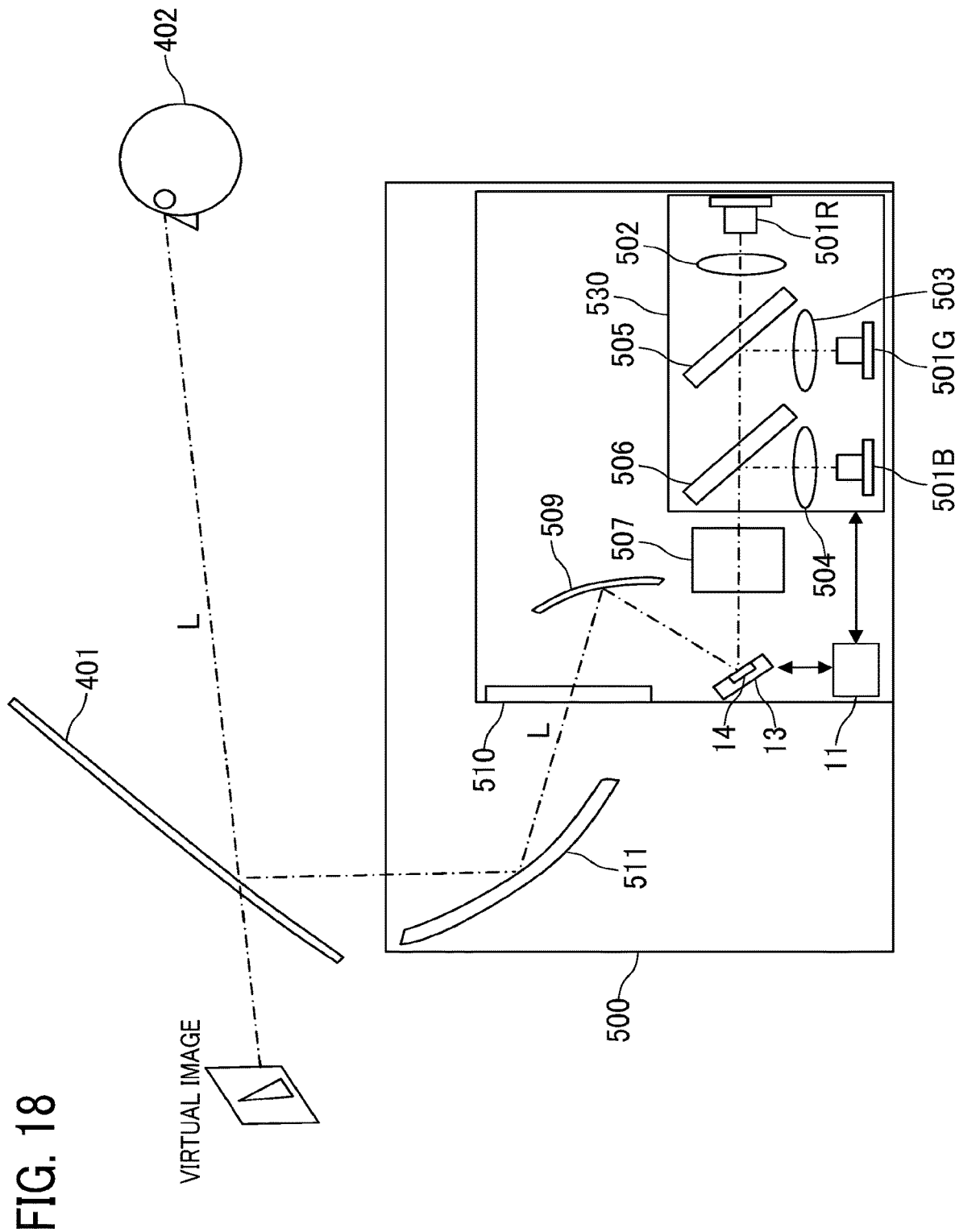
FIG. 18 is a schematic view of a HUD according to an embodiment of the present disclosure.

As illustrated in FIG. 18, the HUD 500 emits laser beams through red, green, and blue laser beam sources 501R, 501G, and 501B, respectively. The emitted laser beams pass through an incident optical system, and then are deflected by the light deflector 13 including the reflecting surface 14. The incident optical system includes collimator lenses 502, 503, and 504 respectively provided for the laser-beam sources 501R, 501G, and 501B, two dichroic mirrors 505 and 506, and a light-intensity adjuster 507.

The deflected laser beams pass through a projection optical system, and are projected onto a screen. The projection optical system includes a free-form surface mirror 509, an intermediate screen 510, and a projection mirror 511.

In the HUD 500, the laser-beam sources 501R, 501G, 501B, the collimator lenses 502, 503, 504, and the dichroic mirrors 505, 506 are combined as a single unit that is an optical housing serving as a light source unit 530.

The HUD 500 projects an intermediate image displayed on the intermediate screen 510 onto the windshield 401 of the vehicle 400 to allow the driver 402 to visually recognize the intermediate image as a virtual image.

The laser beams of RGB colors emitted from the laser-beam sources 501R, 501G, and 501B are approximately collimated by the collimator lens 502, 503, and 504, and are combined by the two dichroic mirrors 505 and 506. The light intensity of the combined laser beams is adjusted by the light-intensity adjuster 507, and then two-dimensional scanning is performed by the light deflector 13 provided with the reflecting surface 14. The projection light L used for two-dimensional scanning by the light deflector 13 is reflected by the free-form surface mirror 509 so as to correct the distortion, and then is collected and focused onto the intermediate screen 510 to display an intermediate image on the intermediate screen 510. The intermediate screen 510 is constituted by, for example, a microlens array in which a plurality of microlenses are two-dimensionally arranged, and expands the projected light L incident on the intermediate screen 510 in units of microlens.

The light deflector 13 moves the reflecting surface 14 biaxially in a reciprocating manner to perform two-dimensional scanning with the projection light L incident on the reflecting surface 14. The reflecting surface of light deflector 13 is controlled to drive in synchronization with the timing of light emission of the laser beam sources 501R, 501G, and 501B.

In the above description, the HUD 500 is described as an example of the image projection apparatus. However, no limitation is indicated thereby, and the image projection apparatus may be any apparatus that performs optical scanning, using light deflector 13 provided with the reflecting surface 14, to project an image, other than a HUD.

For example, the present disclosure is also applicable to a projector that is placed on a desk or the like and projects an image on a display screen, a head-mounted display device that is incorporated in a wearable member on the head of the observer, for example, and that projects an image on a reflective-and-transmissive screen of the wearable member or on an eyeball as a screen, and the like.

The image projection apparatus may be incorporated in, not only the vehicle or the wearable member, but also, for example, a mobile body such as an aircraft, a ship, or a mobile robot; or an immobile body such as an operation robot that operates a driving target such as a manipulator without moving from the installed location.

Incorporating the light deflector according to the first embodiment to the fourth embodiment into an image projection device enables the movable part to project an image at a higher angle of view and a higher resolution.

Next, an optical writing device to which the light deflector 13 according to an embodiment of the present disclosure is applied is described in detail with reference to FIGS. 19 and 20.

Figure 19:
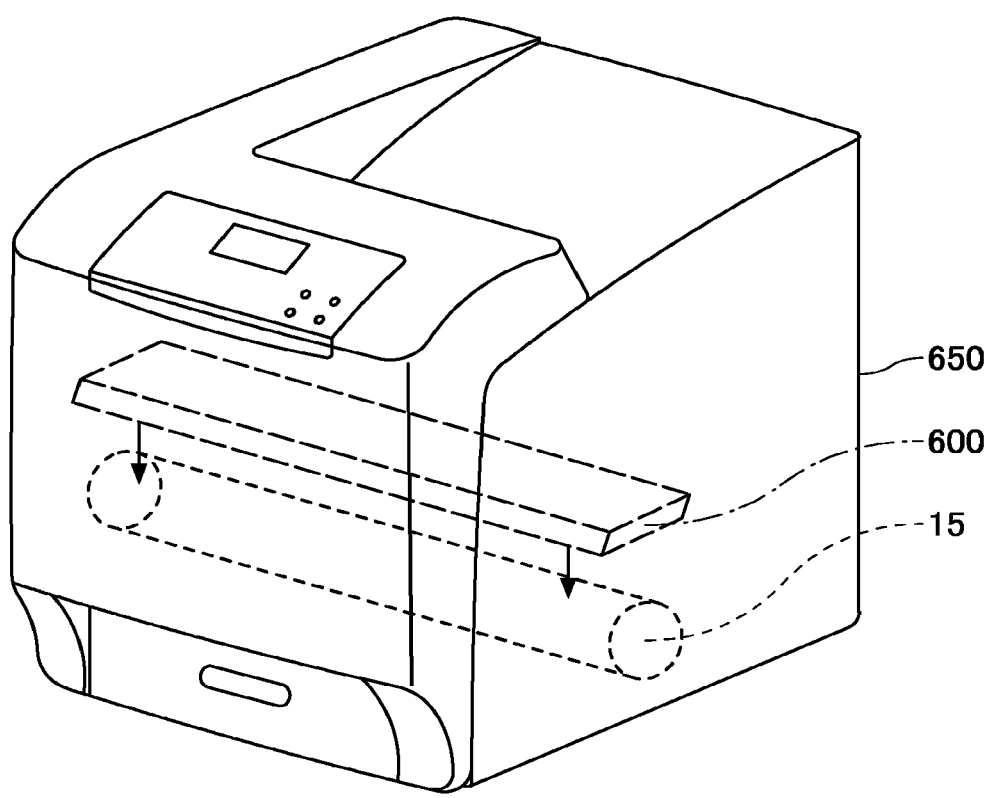
FIG. 19 is a schematic view of an example of an image forming apparatus equipped with an optical writing device.

FIG. 19 is an illustration of an example of an image forming apparatus equipped with an optical writing device 600. FIG. 20 is a schematic view of an example of the optical writing device 600.

As illustrated in FIG. 19, the optical writing device 600 is used as a component of an image forming apparatus typified by a laser printer 650, for example, having printer functions using laser beams. In the image forming apparatus, the optical writing device 600 performs optical scanning on a photoconductor drum, which is the target surface 15, by using one or more laser beams, thereby performing optical writing on the photoconductor drum.

Figure 20:
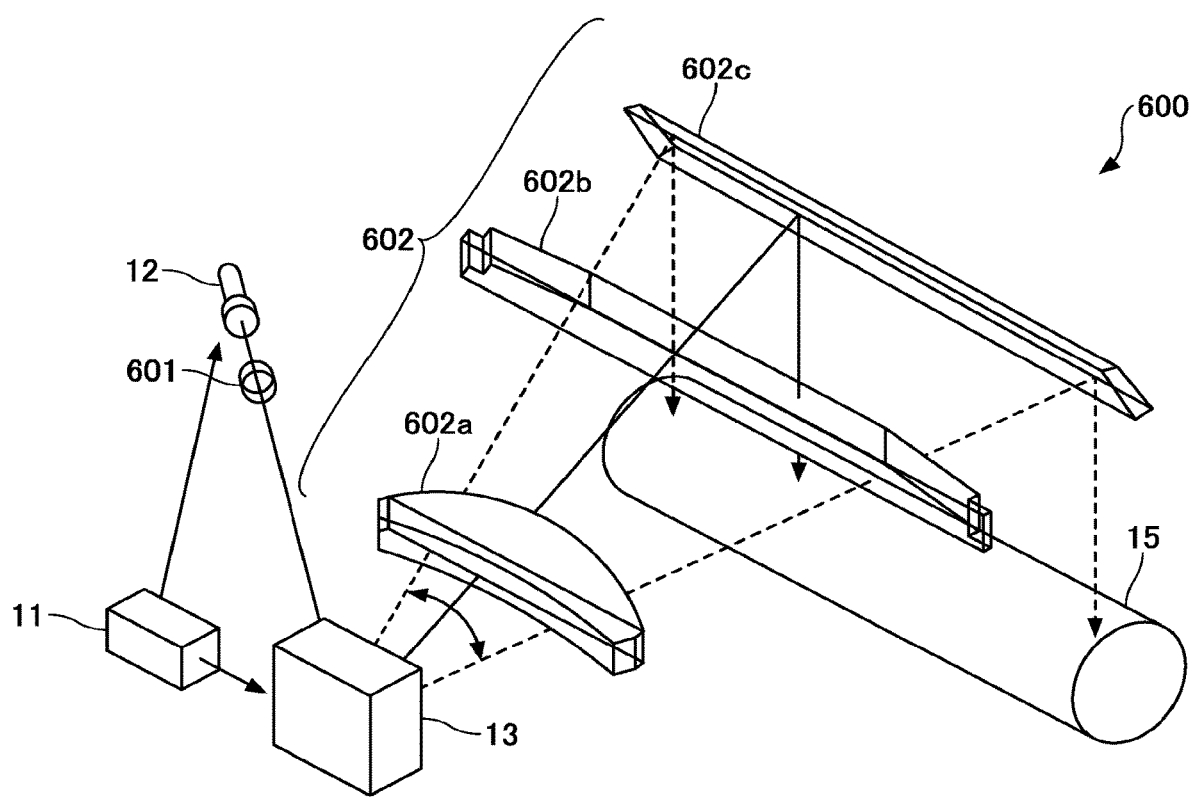
FIG. 20 is a schematic view of an example of the optical writing device.

As illustrated in FIG. 20, in the optical writing device 600, the laser beam from the light-source device 12 such as a laser element passes through an image forming optical system 601 such as a collimator lens and is then deflected uniaxially or biaxially by the light deflector 13 including the reflecting surface 14.

The laser beam deflected by the light deflector 13 passes through a scanning optical system 602 constituted by a first lens 602a, a second lens 602b, and a reflecting mirror unit 602c, and is emitted onto the target surface 15 (e.g., a photoconductor drum or photosensitive paper), thus performing optical writing. The scanning optical system 602 forms a laser beam in the form of a spot on the target surface 15.

The light deflector 13 that includes the light-source device 12 and the reflecting surface 14 are driven in accordance with the control of the driver 11.

As described above, the optical writing device 600 can be used as a component of the image forming apparatus having a printer function using laser beams.

Moreover, by employing another scanning optical system to perform scanning in a biaxial manner in addition to the uniaxial manner, the optical writing device 600 can also be used as a component of an image forming apparatus such as a laser label apparatus that deflects laser beams to perform optical scanning on thermal media and print letters by heating the thermal media.

The light deflector 13 including the reflecting surface 14 to be applied to the optical writing device is advantageous in saving power of the optical writing device because power consumption for driving the light deflector 13 is less than that for driving a rotational polygon mirror or the like.

The light deflector 13 makes a smaller wind noise when the mirror substrate oscillates than rotational polygon mirror, and thus is advantageous in achieving low noise of the optical writing device. The optical writing device requires much smaller installation space than a rotational polygon mirror, and the amount of heat generated by the light deflector 13 is small. For this reason, downsizing is easily achieved, and thus the optical writing device is advantageous in downsizing the image forming apparatus.

Incorporating the light deflector according to the first embodiment to the fourth embodiment into an optical writing device enables the movable part to optically write data at a higher angle of view and a higher resolution.

Next, an object recognition device to which the light deflector 13 according to an embodiment of the present disclosure is applied is described in detail with reference to FIGS. 21 and 22.

Figure 21:
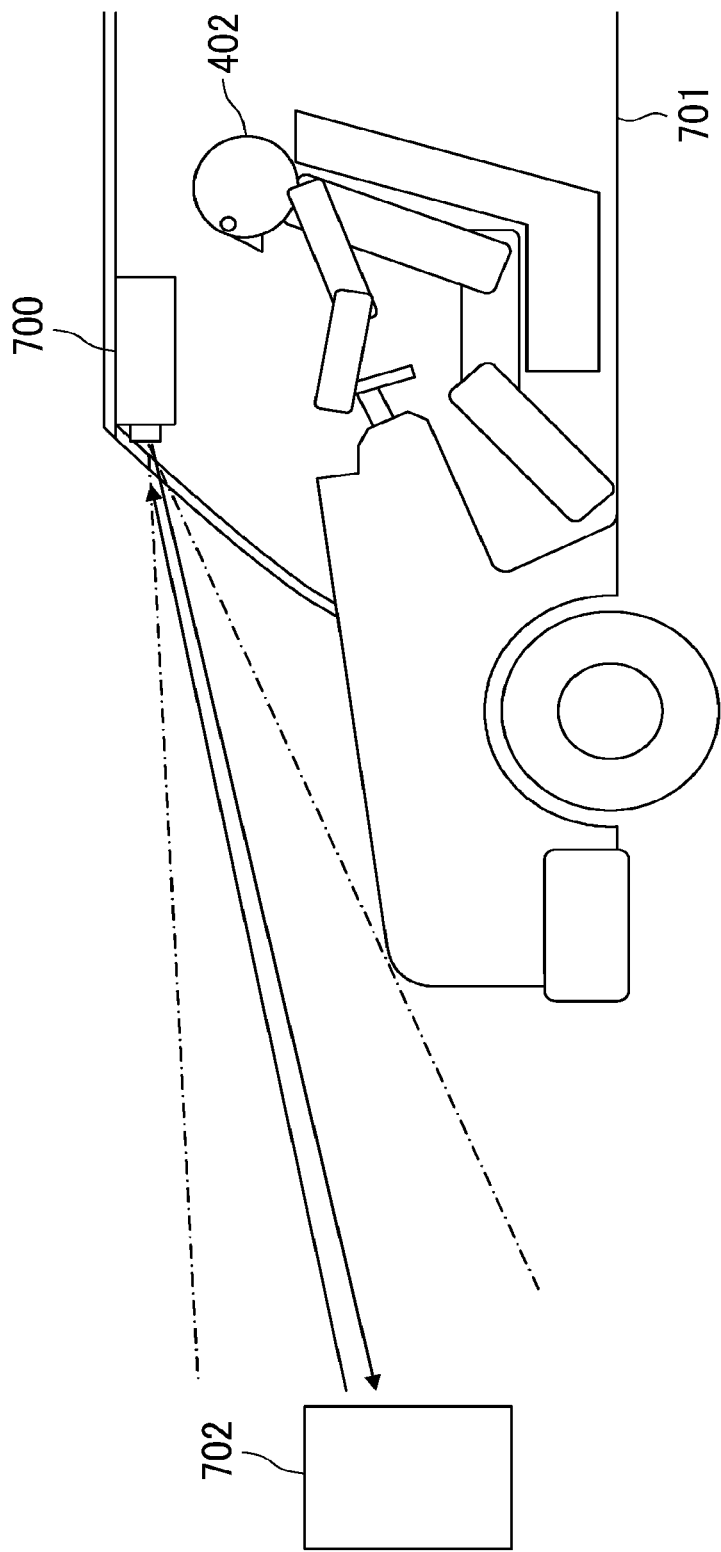
FIG. 21 is a schematic view of a motor vehicle mounted with a light detection and ranging (LiDAR) device.

FIG. 21 is a schematic diagram of a vehicle provided with a LiDAR device that serves as an object recognition device, according to the present embodiment. FIG. 22 is a schematic view of an example of the LiDAR device.

The object recognition device is an apparatus that recognizes an object in a target direction, and is, for example, a LiDAR device.

As illustrated in FIG. 21, for example, a LiDAR device 700 is mounted on a vehicle 701 to perform optical scanning in a target direction and receive the light reflected from an object 702 that exists in the target direction. Accordingly, the object 702 can be recognized by the LiDAR device 700.

Figure 22:
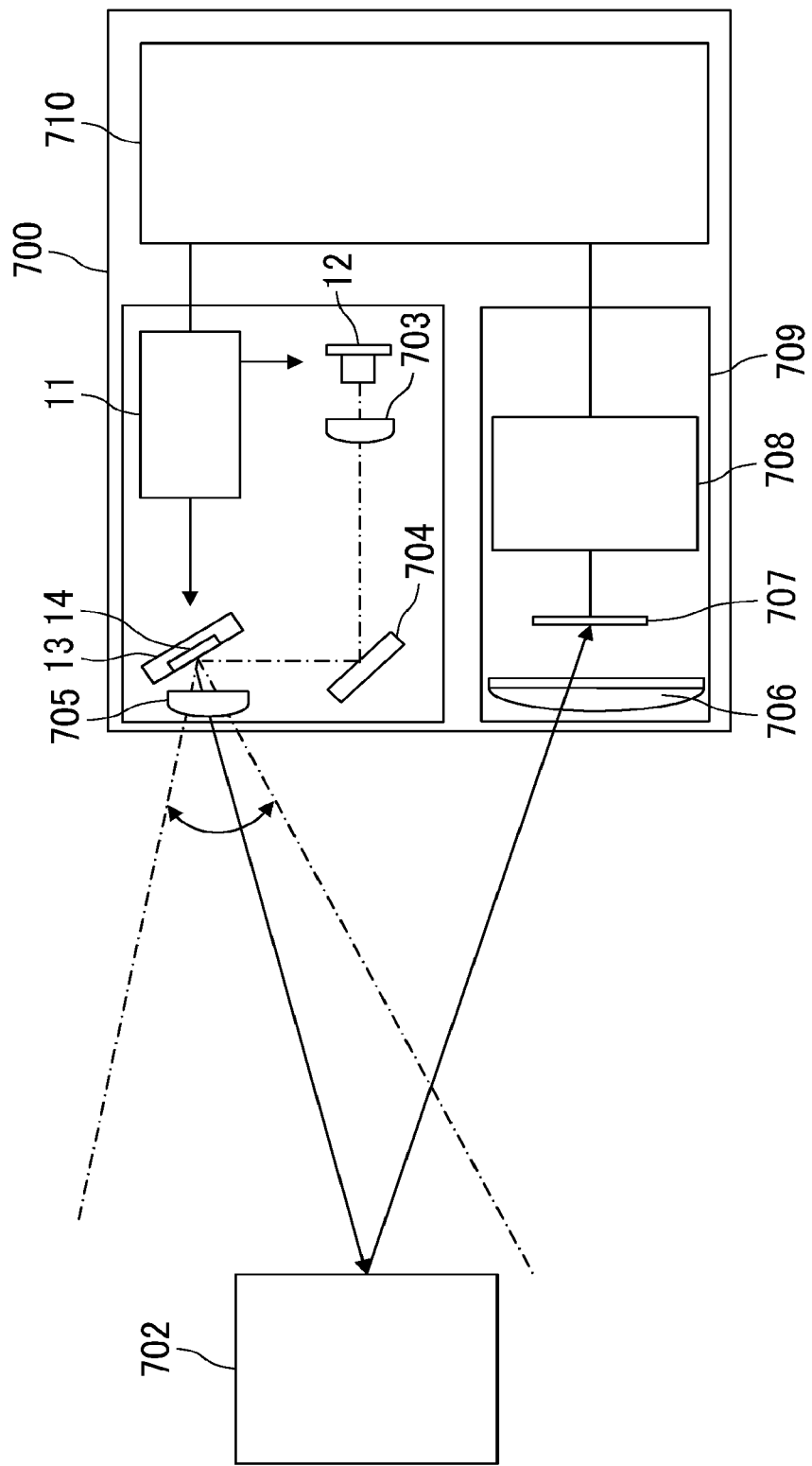
FIG. 22 is a schematic view of the LiDAR device according to an embodiment of the present disclosure.

As illustrated in FIG. 22, the laser beams emitted from a light-source device 12 pass through an incident optical system, and then are caused to perform scanning uniaxially or biaxially using the light deflector 13 including the reflecting surface 14. The incidence optical system includes a collimator lens 703 that serves as an optical system that collimates divergent beams into approximately parallel beams, and a planar mirror 704.

The parallel beams for scanning in two-axis directions are emitted to the object 702 ahead of the device, as passing through, for example, a projection lens 705 that serves as a projection optical system. The driving of the light-source device 12 and the light deflector 13 is controlled by the driver 11. The light reflected by the object 702 is detected by a photosensor 709.

More specifically, the light reflected from the object 702 passes through, for example, a condenser lens 706 that serves as an incident-light receiving optical system, and is received by an image sensor 707. Then, the image sensor 707 outputs a detected signal to a signal processing circuit 708. The signal processing circuit 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photosensor 709 receives the laser beams or the phase difference per pixel of the image sensor 707 that have received the laser beams. Moreover, the distance measuring circuit 710 calculates distance information indicating the distance from the object 702.

The light deflector 13 including the reflecting surface 14 is less likely to be broken and is more compact than a polygon mirror, and thus, a highly durable and compact LiDAR device can be provided.

Such a LiDAR device may be incorporated in, not only the vehicle or the wearable member, but also, for example, a mobile body such as an aircraft, a ship, or a mobile robot; or an immobile body such as an operation robot that operates a driving target such as a manipulator without moving from the installed location. The LiDAR device optically scans a predetermined range and recognizes the presence or absence of an obstacle and a distance to the obstacle.

In the above description, the LiDAR device 700 has been described as an example of the object recognition device, but the object recognition device is not limited to the LiDAR device. However, no limitation is indicated thereby, and the object recognition device any apparatus that performs optical scanning as the driving circuit 11 controls the light deflector 13 provided with the reflecting surface 14 and that receives the reflected laser beam using a photodetector to recognize the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

Incorporating the light deflector according to the first embodiment to the fourth embodiment of the present disclosure into an object recognition device enables the movable part to recognize an object with a higher angle of view and a higher resolution.

Figure 23:
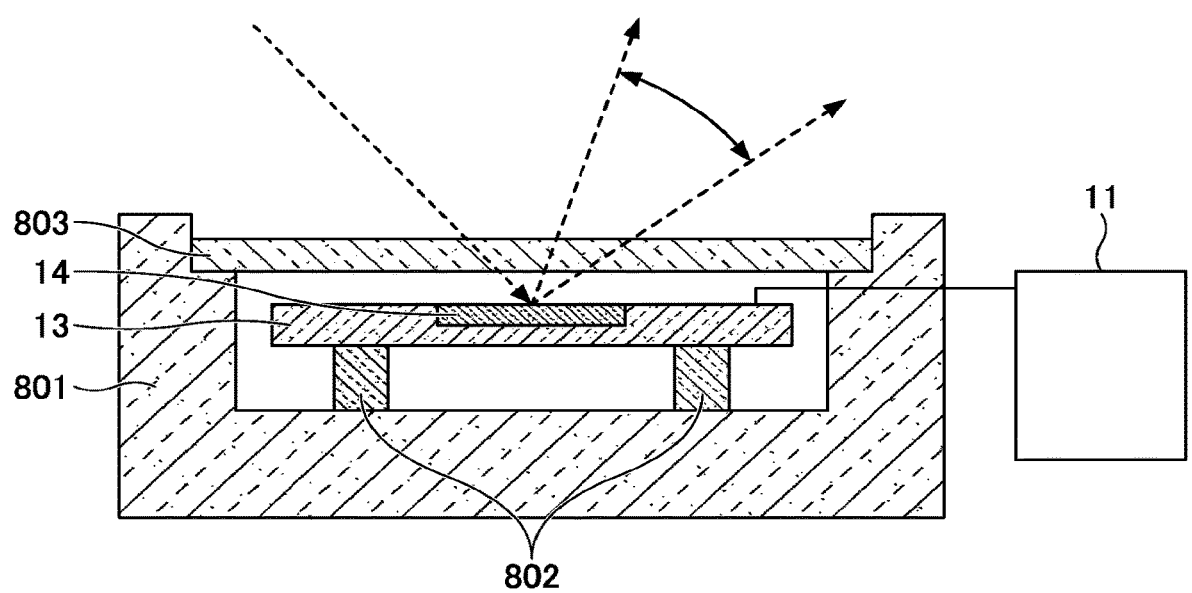
FIG. 23 is a schematic diagram of a packaged light deflector according to an embodiment of the present disclosure.

The following describes the packaging of the light deflector 13 with reference to FIG. 23

FIG. 23 is a schematic diagram of the light deflector 13 packaged according to an embodiment of the present disclosure.

As illustrated in FIG. 23, the light deflector 13 is mounted on a mounting member 802 on the bottom of an angular U-shaped package member 801. The package member 801 is provided with a transmissive member 803 covering an area in which the light deflector 13 is disposed. In this configuration, the package member 801 is sealed by the transmissive member 803 so that the light deflector 13 is packaged.

The package contains inert gas such as nitrogen and is sealed. This configuration can prevent the deterioration of the light deflector 13 due to oxidation, and increase the durability against changes in environment such as temperature.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A light deflector comprising:
   a mirror to reflect light;
   a pair of supports, one end of each of the pair of supports coupled to the mirror to support the mirror;
   a pair of drive beams each coupled to the other end of a corresponding support of the pair of supports, the pair of drive beams to deform the pair of supports to rotate the mirror around a first axis; and
   connecting parts connecting the pair of drive beams to the pair of supports, respectively, each of the connecting parts including a rib,
   wherein junctions between the drive beams and the corresponding supports are parallel to the first axis.

2. The light deflector according to claim 1,
   wherein the rib extends in a direction intersecting with the first axis.

3. The light deflector according to claim 1,
   wherein the rib extends in a direction orthogonal to the first axis.

4. The light deflector according to claim 1,
   wherein the rib is proximate to an end of a corresponding connecting part of the connecting parts, an opposite end of the corresponding connecting part of the connecting parts being connected to a corresponding support of the pair of supports.

5. The light deflector according to claim 1, further comprising a frame supporting the pair of drive beams,
   wherein a member comprising the pair of drive beams, the connecting parts, the pair of supports, and the mirror is supported by the frame in a cantilevered state.

6. The light deflector according to claim 5,
   wherein the connecting parts each has:
   a first area between the first axis and a corresponding drive beam of the pair of drive beams; and
   a second area at an opposite side of the first area relative to the first axis,
   wherein the second area includes a projection projecting in a direction opposite to a direction toward a portion at which the corresponding drive beam is supported by the frame, and
   wherein the projection includes a first fillet of a fillet shape at an end proximate to a corresponding support of the pair of supports.

7. The light deflector according to claim 6,
   wherein the first area includes a second fillet of a fillet shape at a portion proximate to a corresponding support of the pair of supports.

8. The light deflector according to claim 7,
wherein the rib lies across a hypothetical line that extends, along the first axis, from an edge of the second fillet, the edge being closest to a corresponding drive beam of the pair of the drive beams.

9. The light deflector according to claim 6,
wherein the first area includes a second fillet of a fillet shape at a portion proximate to a corresponding support of the pair of supports, and
wherein the first fillet has a different curvature than the second fillet.

10. The light deflector according to claim 6,
wherein the first fillet has an elliptic shape.

11. The light deflector according to claim 6,
wherein the first fillet has an arc shape with a central angle of 90 degrees or less.

12. The light deflector according to claim 5, wherein:
the frame is a movable frame, and
the light deflector further comprises:
a pair of movable supports, one end of each of the pair of movable supports coupled to the movable frame to support the movable frame such that the movable frame is rotatable around a second axis orthogonal to the first axis; and
a stationary frame coupled to the other end of each of the pair of movable supports.

13. The light deflector according to claim 1, further comprising a frame supporting the pair of drive beams, wherein a member comprising the pair of drive beams, the connecting parts, the pair of supports, and the mirror is supported by the frame from both sides.

14. A deflecting device comprising:
the light deflector according to claim 1; and
a light source.

15. An object recognition device comprising the light deflector according to claim 1.

16. A mobile object comprising the object recognition device according to claim 15.

17. An image projection device comprising the light deflector according to claim 1.

18. A mobile object comprising the image projection device according to claim 17.

19. The light deflector according to claim 1, wherein:
a length of each of the pair of supports extends along the first axis,
the rib of each of the connecting parts extends orthogonal to the first axis and connects a drive beam and the corresponding one of the supports, and
the rib of each of the connecting parts is disposed over a corresponding one of the drive beams and a corresponding one of the supports.

20. The light deflector according to claim 1, wherein:
a length of each of the pair of supports extends along the first axis, and
the rib of each of the connecting parts extends orthogonal to the first axis and connects a drive beam and the corresponding one of the supports.

* * * * *